US011201503B2

(12) United States Patent
Huang et al.

(10) Patent No.: US 11,201,503 B2
(45) Date of Patent: Dec. 14, 2021

(54) WIRELESS CHARGING CIRCUIT AND SYSTEM

(71) Applicant: University of Macau, Macau (CN)

(72) Inventors: Zhicong Huang, Macau (CN); Chi-Seng Lam, Macau (CN); Pui-In Mak, Macau (CN); Rui Paulo Da Silva Martins, Macau (CN)

(73) Assignee: University of Macau, Macau (CN)

( * ) Notice: Subject to any disclaimer, the term of this patent is extended or adjusted under 35 U.S.C. 154(b) by 224 days.

(21) Appl. No.: 16/711,465

(22) Filed: Dec. 12, 2019

(65) Prior Publication Data

US 2021/0184499 A1  Jun. 17, 2021

(51) Int. Cl.
| | |
|---|---|
| *H02J 7/00* | (2006.01) |
| *H02J 50/12* | (2016.01) |
| *H02J 7/02* | (2016.01) |
| *H02M 7/219* | (2006.01) |
| *H02M 1/08* | (2006.01) |

(52) U.S. Cl.
CPC ............ *H02J 50/12* (2016.02); *H02J 7/0047* (2013.01); *H02J 7/02* (2013.01); *H02M 7/219* (2013.01); *H02M 1/083* (2013.01)

(58) Field of Classification Search
USPC .......................... 320/106, 107, 108, 109, 110
See application file for complete search history.

(56) References Cited

U.S. PATENT DOCUMENTS 5,382,893 A    1/1995  Dehnel

FOREIGN PATENT DOCUMENTS

| CN | 102013736 A | * | 4/2011 | .......... H02M 7/5381 |
| CN | 104054229 B | * | 1/2018 | .......... H02M 3/3384 |
| JP | 2015080296 A | * | 4/2015 | |
| WO | 9637941 A1 | | 11/1996 | |
| WO | WO-2014007656 A1 | * | 1/2014 | .............. H02J 7/025 |

OTHER PUBLICATIONS

Grant A. Covic et al., Inductive Power Transfer, Proceedings of the IEEE, Jun. 2013, p. 1276-1289, vol. 101 No. 6.

(Continued)

*Primary Examiner* — Brian Ngo
(74) *Attorney, Agent, or Firm* — Eagle IP Limited; Jacqueline C. Lui; Jennifer G. Che

(57) ABSTRACT

An exemplary embodiment of the present invention is a wireless power transmission circuit that provides power to a load of variable resistance with an alternating current (AC) power source induced at a secondary coil in a secondary side of the circuit by a primary coil in a primary side of the said circuit. The wireless power transmission circuit includes a switch-controlled capacitor (SCC) and a semi-active rectifier (SAR). The SCC connects to the AC power source. The SCC includes a first capacitor connected in parallel with two electrically controllable switches in series. The SAR connects to output of the SCC for rectifying the output of the SCC, wherein the SAR comprises a bridge circuit that includes two electrically controllable switches. A control angle of the SCC and a conduction angle of the SAR are regulated to provide a load impedance that matches the impedance of the coils.

20 Claims, 13 Drawing Sheets

(56) References Cited

OTHER PUBLICATIONS

Srdjan Lukic et al., Cutting the Cord, IEEE Electrification Magazine, Sep. 2013, p. 57-64, vol. 1 Issue. 1.
S.Y.R. Hui et al., A New Generation of Universal Contactless Battery Charging Platform for Portable Consumer Electronic Equipment, IEEE Transactions on Power Electronics, May 2005, p. 620-627, vol. 2 No. 3.
S. Y. Hui, Planar wireless charging technology for portable electronic products and Qi, Proceedings of the IEEE, Jun. 2013, p. 1290-1301,vol. 101 No.6.
Qianhong Chen et al., Analysis, Design, and Control of a Transcutaneous Power Regulator for Artificial Hearts, IEEE Transactions on Biomedical Circuits and Systems, Feb. 2009, p. 23-31, vol. 3 No.1.
Anil Kumar Ramrakhyani et al., Design and optimization of resonance-based efficient wireless power delivery systems for biomedical implants, IEEE Transactions on Biomedical Circuits and Systems, Feb. 2010, p. 48-63, vol. 5 No. 1.
Roman Bosshard et al., Inductive power transfer for electric vehicle charging: Technical challenges and tradeoffs, IEEE Power Electronics Magazine, Sep. 2016, p. 22-30, vol. 3 No. 3.
John T. Boys et al., The inductive power transfer story at the University of Auckland, IEEE Circuits and Systems Magazine, May 2015, p. 6-27, vol. 15 No. 2.
Ala Al-Haj Hussein et al., A review of charging algorithms for nickel and lithium battery chargers, IEEE Transactions an Vehicular Technology, Mar. 2011, p. 830-838, vol. 60 No. 3.
Jian Cao et al., A new battery/ultracapacitor hybrid energy storage system for electric, hybrid, and plug-in hybrid electric vehicles, IEEE Transactions on Power Electronics, Jan. 2012, p. 122-132, vol. 27 No. 1.
Murat Yilmaz et al., Review of battery charger topologies, charging power levels, and infrastructure for plug-in electric and hybrid vehicles, IEEE transactions on Power Electronics, May 2013, p. 2151-2169, vol. 28 No. 5.
N.K. Poon et al., A constant-power battery charger with inherent soft switching and power factor correction, IEEE Transactions on Power Electronics, Nov. 2003, p. 1262-1269,vol. 18 No. 6.
A. Kuperman et al., Battery charger for electric vehicle traction battery switch station, IEEE Transactions on Industrial Electronics, Dec. 2013, p. 5391-5399, vol. 60 No. 12.
Yasha Parvini et al., Heuristic versus optimal charging of supercapacitors, lithium-ion, and lead-acid batteries: An efficiency point of view, IEEE Transactions on Control Systems Technology, Jan. 2018, p. 167-180, vol. 26 No. 1.
Wel Zhang et al., Analysis and comparison of secondary series-and parallel-compensated inductive power transfer systems operating for optimal efficiency and load-independent voltage-transfer ratio, IEEE Transactions on Power Electronics, Jun. 2014, p. 2979-2990, vol. 29 No. 6.
Yeong H. Sohn et al., General unified analyses of two-capacitor inductive power transfer systems: Equivalence of current-source SS and SP compensations, IEEE Transactions on Power Electronics, Nov. 2015, p. 6030-6045, vol. 30 No. 11.
Wel Zhang et al., Load-independent duality of current and voltage outputs of a series-or parallel-compensated inductive power transfer converter with optimized efficiency, IEEE Journal of Emerging and Selected Topics in Power Electronics, Mar. 2015, p. 137-146, vol. 3 No. 1.
Zhicong Huang et al., Design of a single-stage inductive-power-transfer converter for efficient EV battery charging, IEEE Transactions on Vehicular Technology, Jul. 2017, p. 5808-5821, vol. 66 No. 7.
Xiaohui Qu et al., Design of a current-source-output inductive power transfer LED lighting system, IEEE Journal of Emerging and Selected Topics in Power Electronics, p. 306-314, Mar. 2015, vol. 3 No. 1.
Hulong Zeng et al., SiC-based Z-source resonant converter with constant frequency and load regulation for EV wireless charger, IEEE Transactions on Power Electronics, Nov. 2017, p. 8813-8822, vol. 32 No. 11.
Oliver Knecht et al., Performance Evaluation of Series-Compensated IPT Systems for Transcutaneous Energy Transfer, IEEE Transactions on Power Electronics, Jan. 2019, p. 438-451, vol. 34 No. 1.
Andreas Berger et al., A wireless charging system applying phase-shift and amplitude control to maximize efficiency and extractable power, IEEE Transactions on Power Electronics, Nov. 2015, p. 6338-6348, vol. 30 No. 11.
Zhenjie Li et al., A 3-kW wireless power transfer system for sightseeing car supercapacitor charge, IEEE Transactions on Power Electronics, May 2017, p. 3301-3316, vol. 32 No. 5.
Wenxing Zhong et al., Reconfigurable wireless power transfer systems with high energy efficiency over wide load range, IEEE Transactions on Power Electronics, p. 6379-6390, Jul. 2018, vol. 33 No. 7.
W. X. Zhong et al., Maximum energy efficiency tracking for wireless power transfer systems, IEEE Transactions on Power Electronics, Jul. 2015, p. 4025-4034, vol. 30 No. 7.
Zhicong Huang et al., An Inductive-Power-Transfer Converter With High Efficiency Throughout Battery-Charging Process, IEEE Transactions on Power Electronics, p. 10245-10255, Oct. 2019, vol. 34 No. 10.
Tobias Diekhans et al., A dual-side controlled inductive power transfer system optimized for large coupling factor variations and partial load, IEEE Transactions on Power Electronics, Nov. 2015, p. 6320-6328, vol. 30 No. 11.
Qianhong Chen et al., Research on bidirectional contactless resonant converter for energy charging between EVs, IECON 2013—39th Annual Conference of the IEEE Industrial Electronics Society, IEEE, 2013, p. 1236-1241.
Kerim Colak et al., A novel phase-shift control of semibridgeless active rectifier for wireless power transfer, IEEE Transactions on Power Electronics, Nov. 2015, p. 6288-6297, vol. 30 No. 11.
Wen-Jian Gu et al., A new method to regulate resonant converters, IEEE Transactions on Power Electronics, Oct. 1988, p. 430-439, vol. 3 No. 4.
Muhammad Yaqoob et al., Fully soft-switched dual-active-bridge series-resonant converter with switched-impedance-based power control, IEEE Transactions on Power Electronics, Nov. 2018, p. 9267-9281, vol. 33 No. 11.

* cited by examiner

| Parameters | Symbols | Values |
| --- | --- | --- |
| Self inductance | $L_P$, $L_S$ | 86 μH, 102 μH |
| Coupling coefficient | $k$ | 0.26 |
| Coil resistance | $R_{P,w}$, $R_{S,w}$ | 0.3 Ω, 0.328 Ω |
| Inverter switch | $R_{on1}$ | 0.1 Ω |
| SCC switch | $R_{on2}$, $V_{f2}$ | 0.1 Ω, 0.7 V |
| SAR switch | $R_{on3}$, $V_{f3}$ | 0.1 Ω, 0.7 V |
| Operating frequency | $\frac{\omega}{2\pi}$ | 85KHz |
| Compensation capacitance | $C_P$, $C_1$, $C_2$ | 40.8 nF, 44 nF, 166 nF |
| Optimum load resistance | $R_{eq,opt}$ | fixed at 18 Ω |

1300

| Battery Specifications | Values |
|---|---|
| Rated charging power $P_O$ | 150 W |
| Battery terminal voltage $V_O$ | 51–84.6 V |

| Parameters | Symbols | Measured Values |
|---|---|---|
| Input voltage | $V_I$ | 48 V |
| Switches | $Q_1$–$Q_4$, $Q_a$, $Q_b$, $Q_6$, $Q_8$ | IPP60R099 with $R_{on} \approx 0.099\Omega$ and $V_F \approx 0.7$ V |
| Diodes | $D_5$, $D_7$ | MBR20200 with $V_F \approx 0.7$ V |
| Self inductance | $L_P$, $L_S$ | 85.09 $\mu$H, 101.13 $\mu$H |
| Coupling coefficient | $k$ | 0.262 |
| Coil resistance | $R_{P,w}$, $R_{S,w}$ | 0.38 $\Omega$, 0.41 $\Omega$ |
| Primary compensation | $C_P$ | 41 nF |
| Secondary compensation | $C_1$, $C_2$ | 155 nF, 55 nF |
| Operating frequency | $\frac{\omega}{2\pi}$ | 85 kHz |

WIRELESS CHARGING CIRCUIT AND SYSTEM

FIELD OF INVENTION

This invention relates to an electronic circuit, and in particular a wireless charging circuit.

BACKGROUND OF INVENTION

Inductive power transfer (IPT) is a growing technology for providing power wirelessly, which is useful in situations where physical connection is inconvenient or impossible, e.g., hostile environments with dirt, moisture, etc. With simple charging operations and no safety concerns associated with electrical connections, IPT systems are suitable for wireless battery charging in a variety of applications, such as mobile electronics, biomedical implants, small home appliances and electric vehicles.

New devices and systems that enhance the charging efficiency of the IPT systems are desirable to meet the demanding need and contribute to the technology.

SUMMARY OF INVENTION

An exemplary embodiment of the present invention is a wireless power transmission circuit that provides power to a load of variable resistance with an alternating current (AC) power source induced at a secondary coil in a secondary side of the circuit by a primary coil in a primary side of the said circuit. The wireless power transmission circuit includes a switch-controlled capacitor (SCC) and a semi-active rectifier (SAR). The SCC connects to the AC power source. The SCC includes a first capacitor connected in parallel with two electrically controllable switches in series. The SAR connects to output of the SCC for rectifying the output of the SCC, wherein the SAR comprises a bridge circuit that includes two electrically controllable switches. Both switches in the SCC are turned on for half a cycle and complement to each other and are turned off with a time delay relative to the zero cross points of the AC power source, and the time delay is a control angle of the SCC. Both switches in the SAR are turned on for half a cycle and complement to each other and are turned off with a time delay relative to the zero cross points of the AC power source, and that time delay is a conduction angle of the SAR. The control angle of the SCC and the conduction angle of the SAR are regulated to provide a load impedance that matches the impedance of the coils, so that the wireless power transmission provides constant power output and enhance the power transmission efficiency.

Another exemplary embodiment is a wireless charging system that enhances efficiency of the charging a battery with an AC power source induced at the secondary coil in a secondary side of the circuit by a primary coil in a primary side of the circuit. The system includes a switch-controlled capacitor (SCC), a semi-active rectifier (SAR), a plurality of sensors, a controller and at least one signal generator. The SCC connects with the secondary coil. The SCC includes a first capacitor connected in parallel with two electrically controllable switches in series. The SAR connects to output of the SCC for rectifying the output of the SCC. The SAR includes a bridge circuit that includes two electrically controllable switches. The sensors are for measuring charging voltage and charging current. The controller is for calculating a conduction angle for the so SAR and a control angle for the SCC according to the sensor's measurement and a pre-determined power value. The signal generator(s) is for generating control signals according to the conduction angle and the control angle and providing the control signals to the switches in the SCC and the SAR. Both switches in the SCC are turned on for half a cycle and complement to each other and are turned off with a time delay relative to the zero cross points of the current waveform of the AC power source and that time delay is the control angle of the SCC. Both switches in the SAR are turned on for half a cycle and complement to each other and are turned off with a time delay relative to the zero cross points of the current waveform of the AC power source and that time delay is the conduction angle of the SAR. The control angle of the SCC and the conduction angle of the SAR are regulated by the control signals to provide a load impedance that matches the impedance of the coils so that the battery is charged with constant power and the charging efficiency is enhanced.

Another example embodiment is a method executed by a wireless charging system that enhance the efficiency of charging a battery with an AC power source induced at the secondary coil by a primary coil. The AC power source connects to a switch-controlled capacitor (SCC) circuit further connecting to a semi-active rectifier (SAR) circuit. The output of the SAR is connected to the battery to be charged. The SCC includes a first fixed-value capacitor connected in parallel with two electrically controllable switches in series and the SAR includes a bridge circuit that has two upper legs and two lower legs. Each upper leg includes one diode and each lower leg includes an electrically controllable switch. The method includes the steps of calculating a conduction angle of the SAR to provide a load resistance that matches the impedance of the coils by a controller; calculating a control angle of the SCC to counterbalance reactance of the load and the secondary coil by the controller; regulating the switches in the SAR according to the conduction angle by a first control signal; and regulating the switches in the SCC according to the control angle by a second control signal, so that the wireless charging system charges the battery with constant power and enhance the charging efficiency. The conduction angle is the time delay offset relative to the zero crossing points of the current waveform of the AC power source when a controllable switch at the lower leg of the SAR bridge circuit is turned off and the control angle is the time delay offset relative to the zero crossing points of the current waveform of the AC power source when a controllable switch at the SCC is turned off.

Other example embodiments are discussed herein.

BRIEF DESCRIPTION OF FIGURES

FIG. 13 shows a table of parameters for a charging circuit in accordance with an example embodiment.

DETAILED DESCRIPTION

Figure 1:
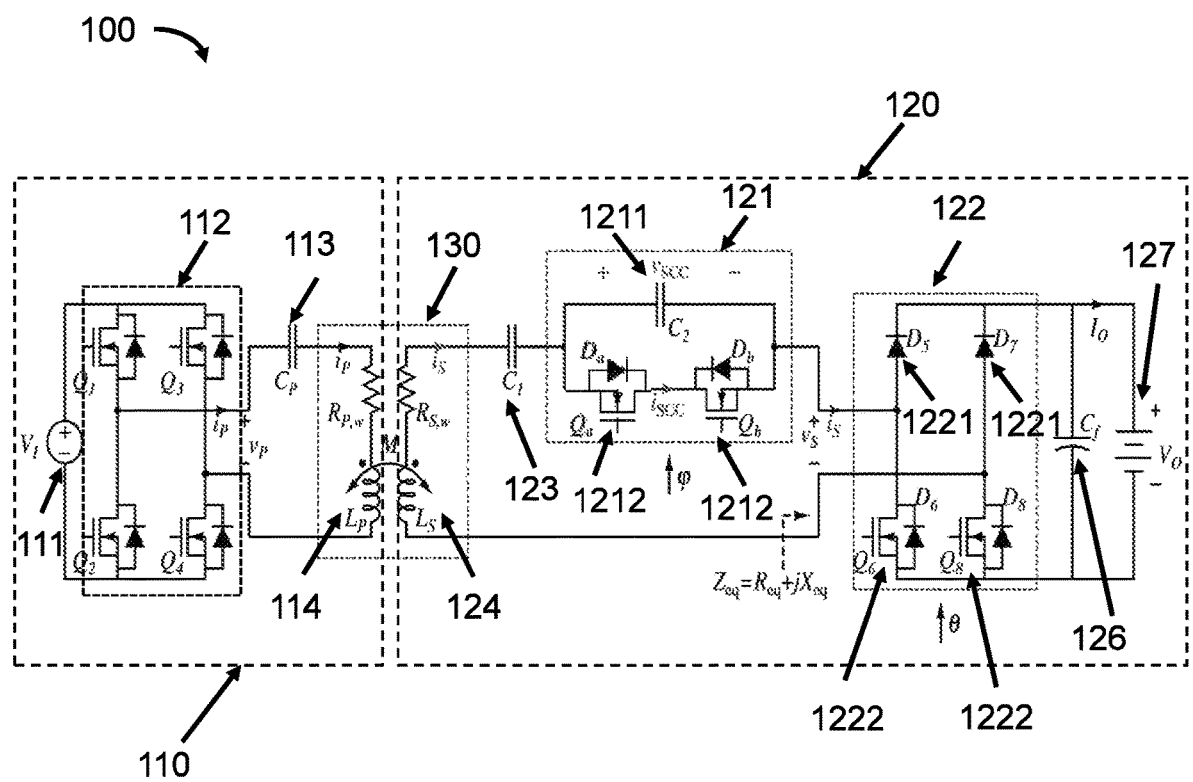
FIG. 1 shows a schematic diagram of a wireless charging circuit in accordance with an example embodiment.

Constant current (CC) charging is a common charging technique and a dominant charging process for widely-used lithium ion batteries. In the process of CC, the charging current is kept constant while the charging voltage is clamped to the terminal voltage of the battery which increases during charging. As a result, the charging power starts from the minimum value and increases to the maximum value at the completion. Since charging at high power level only lasts for a short duration of time, the power capacity of the charger has a low utilization.

An alternative way of charging is constant-power (CP) charging, during which the output power provided from the charger to the battery is maintained at a predetermined value. The charging current varies inversely with respect to the charging voltage to during CP charging. Given the same maximum charging power, CP charging can achieve much faster charging speed than CC charging.

Generally, an IPT converter is required to operate at fixed operating frequencies with load-independent transfer characteristic to minimize control complexity, and the load range is restricted in order to achieve maximum efficiency. However, conventional IPT converters only output constant current or constant voltage at the fixed operating frequencies. The output power of the IPT converter varies with the load condition, and thus not comply with the CP charging profile.

Also, the IPT converter is required to have load matching ability to achieve high efficiency, as the efficiency may decrease significantly at the mismatched load conditions.

Since the load range during battery charging is wide, it is difficult for the IPT converter to maintain a high and stable efficiency.

One possible solution for CP charging is using a two-stage IPT system, where a front-end converter modulates the input of the IPT converter, and a load-side converter is cascaded for power regulation. Unfortunately, the two-stage system has penalties of power loss, control complexity, and need for wireless feedback communication.

Example embodiment solve one or more problems identified above and provide a single-stage IPT converter based on series-series compensated inductive power transfer (SSIPT) converter by including a switched-controlled compensation capacitor and a semi-active rectifier (SAR) in the secondary side of the circuit. Consisting of a capacitor connected in parallel with two electrically controllable switches in series, the switch-controlled capacitor (SCC) is equivalent to a variable capacitor with a controllable reactance corresponding to the control angle of the switches, which is used to counterbalance the reactance of the secondary circuit. The SAR also includes two electrically controllable switches that can be controlled to regulate the load impedance of the circuit. The conduction angle of the switches in SAR and the control angle of the switches in SCC are adjusted cooperatively to maintain a null reactance and an optimum load resistance of the circuit, so that the IPT converter can provide constant power output and maximize the power transmission efficiency.

Example embodiments include a battery management system to regulate the charging power in real-time by controlling the SCC and SAR, so that wireless charger can perform CP charging with maximum efficiency, while permitting fixed operating frequency and soft switching without the need of additional power switch, extra cascading converter or wireless feedback communication. Moreover, example embodiments can achieve soft switching and low voltage stress as well.

As described herein, the same symbols, in different figures and throughout the descriptions, represent the same meaning or the same component. Unless specified, otherwise $X_{subscript}$ represents the reactance of a corresponding component indicated by its subscript.

FIG. 1 shows a schematic diagram of a wireless charging circuit 100 in accordance with an example embodiment.

In FIG. 1, the wireless charging circuit 100 includes a primary side 110 and a secondary side 120. The primary side 110 includes a DC power source 111 with voltage of $V_I$, a full bridge inverter 112 with four switches $Q_1$-$Q_4$ for converting the DC power to an AC power, a primary compensation capacitor 113 with fixed capacitance value $C_P$ and a primary coil 114 that are connected in series. The secondary side 120 includes a secondary coil 124, a secondary compensation capacitor 123 with fixed capacitance value $C_1$, an SCC 121, an SAR 122 that are connected in series. An output filter capacitor $C_f$ connects in parallel with the SAR 122 and the battery 127 with charging voltage of $V_o$.

The SCC 121 consists of a capacitor 1211 with a fixed capacitance value $C_2$ and two electronically controllable switches 1212. The electronically controllable switches in the SCC 121 includes two Metal-Oxide-Semiconductor Field-Effect Transistors (MOSFETs) denoted as $Q_a$ and $Q_b$. Each MOSFET connects with an anti-parallel body diodes denoted as $D_a$ and $D_b$. The drains of $Q_a$ and $Q_b$ are connected together and the sources of $Q_a$ and $Q_b$ are connected to the two terminals of the capacitor 1211 respectively. Control signals are provided to the MOSFETs via the gates of the $Q_a$ and $Q_b$. The capacitor 1211 and the switches 1212 are connected in parallel. The equivalent variable capacitance of the SCC 121 is represented by $C_{SCC}$. The voltage across the SCC is represented by $v_{SCC}$, the current flowing through the SCC switches is represented by $i_{SCC}$, and the equivalent capacitance is represented by $C_{SCC}$. Compared with a single SCC, series connection of the capacitor $C_1$ and an SCC can reduce the voltage stress of the SCC switches.

The SAR 122 consists two diodes 1221 denoted as $D_5$ and $D_7$ in the upper legs, and two electronically controllable switches 1222 in the lower legs. Each electronically controllable switch 1222 includes a transistor denoted as $Q_6$ and $Q_8$ and an anti-parallel body diodes denoted as $D_6$ and $D_8$, respectively. $Q_6$ and $Q_8$ in the SAR 122 are two MOSFETs. The drains of $Q_6$ and $Q_8$ are connected to the two upper legs respectively, and the sources of $Q_6$ and $Q_8$ are connected to each other. Control signals are provided to the MOSFETs via the gates of the $Q_a$ and $Q_b$.

The primary coil 114 and the secondary coil 124 form a magnetic coupler 130 that has mutual inductance M. For example, the magnetic coupler 130 is a loosely coupled transformer. The primary coil 114 has primary self-inductance LP and resistance $R_{P,w}$ that represent primary coil losses. The secondary coil 124 has secondary self-inductance $L_S$ and resistance $R_{S,w}$ that represent secondary coil losses. The coupling coefficient is defined as $k=M/\sqrt{L_P L_S}$.

In the wireless charging circuit 100, the DC voltage source $V_I$ is modulated into AC voltage $v_P$ at an angular frequency $\omega$ by the inverter 112 to drive the primary coil 114. The AC voltage $v_P$ induces an AC current $i_S$ in the secondary coil 124 and further a secondary AC voltage $v_S$. The secondary AC voltage $v_S$ and AC current $i_S$ are input into the SAR 122 and rectified to DC output with the output filter capacitor 126 that has a capacitance $C_f$. $V_O$ and $I_O$ represent the DC charging voltage and current for the battery 127, respectively.

In one example embodiment, the switches 1222 in the SAR 122 are turned on during the on time of their anti-parallel diodes to have zero voltage switching (ZVS). Both $Q_6$ and $Q_8$ are turned on for half a cycle and they are complements of each other. Therefore, $Q_6$ and $Q_8$ are turned off with a time delay of $\pi-\theta \in [0,\pi]$, to the zero cross points of the AC current $i_S$. $\theta$ is defined as the conduction angle of the SAR. The conduction angle $\theta$ has maximum value of $\pi$ and minimum value of 0. The change of the conduction angle $\theta$ affects the phase angle between $v_S$ and $i_S$.

In one example embodiment, the switches 1212 in the SCC 121 are synchronized with the AC current $i_S$, and have a control angle $\varphi \in [\pi/2,\pi]$ with the zero-cross point of $i_S$. Both switches $Q_a$ and $Q_b$ are turned on for half a cycle and they are complements of each other. For example, $Q_a$ and $Q_b$ are turned on and off at zero voltage of $v_{SCC}$, so that soft switching can be achieved to minimize the switching losses. The available charging time (or discharging time) for the capacitor $C_2$ in the SCC in half a cycle is $\pi-\varphi$, which decreases with the increase of $\varphi$ and results in a small equivalent root mean square (RMS) value of $v_{SCC}$. Consequently, the equivalent capacitance of the SCC, i.e. $C_{SCC}$, can be modulated by varying the control angle $\varphi$.

In one example embodiment, the conduction angle $\theta$ of the SAR 122 and the control angle $\varphi$ of the SCC 121 are regulated to provide a load impedance that matches the impedance and mutual reactance of the coils 114 and 124, so that the wireless charging circuit charges the battery 127 with constant power output and thus enhance the charging efficiency.

In an example embodiment, the SCC 121 and the SAR 122 include electronically controllable switches, such as MOSFET or other kind of transistors.

In one example embodiment, the drain of each transistor in SAR 122 is connected with one upper leg respectively, and sources of the two transistors in the SAR 122 are connected with each other.

In one example embodiment, the two transistors of the SAR 122 are included in the two upper legs respectively, and each lower leg includes one diode.

In one example embodiment, the magnetic coupler 130 is a loosely coupled transformer has mutual inductance M.

In one example embodiment, the battery 127 is replaced with a load with variable resistance. Therefore, the circuit 100 becomes a wireless power transmission circuit that can provide constant power to the load with maximum efficiency.

Figure 2:
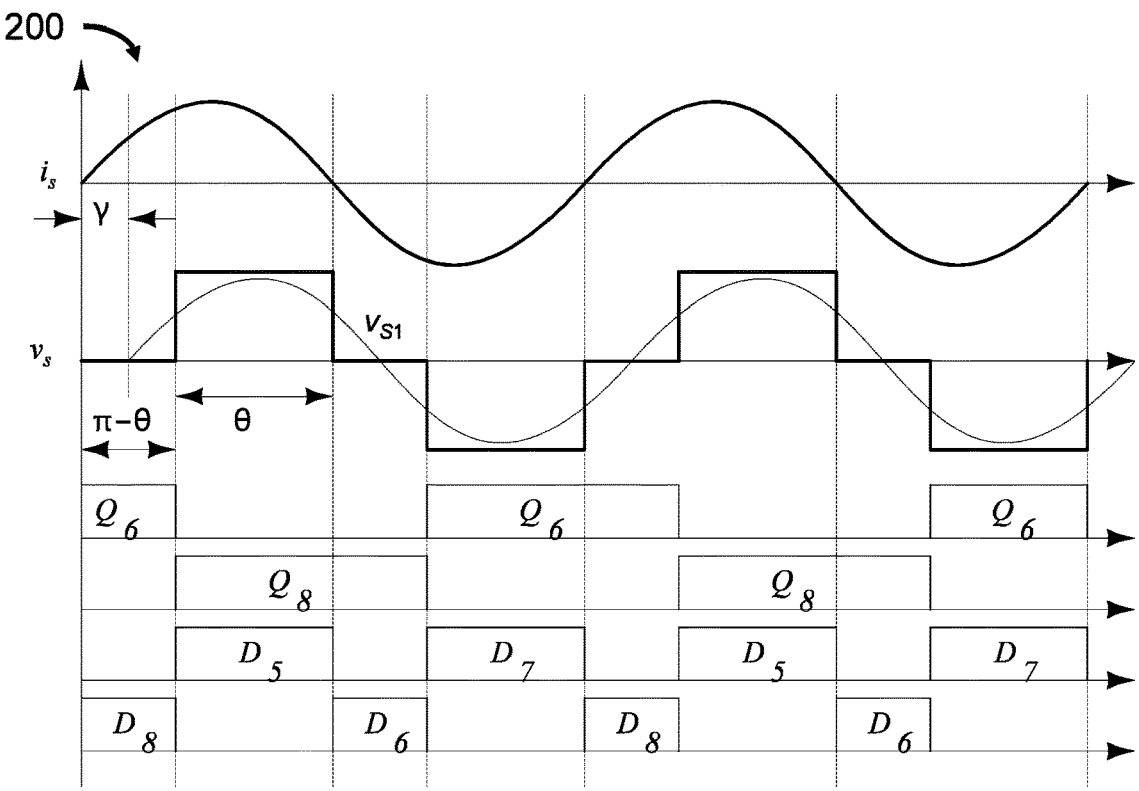
FIG. 2 shows switching sequences and operation waveforms of a semi-active rectifier (SAR) in accordance with an example embodiment.

FIG. 2 shows switching sequences and operation waveforms 200 of an SAR in accordance with an example embodiment.

As shown in FIG. 2, the switches $Q_6$ and $Q_8$ in the SAR 122 are turned on during the on time of their anti-parallel diodes to have zero voltage switching (ZVS). Both $Q_6$ and $Q_8$ are turned on for half a cycle and they are complements of each other. The conduction angle of the SAR 122 is $\theta$. $v_{S1}$ is the fundamental component of the secondary voltage $v_S$ and it lags the secondary current $i_S$ with a phase angle given by $$\gamma = \frac{\pi - \theta}{2}.$$

Therefore, the equivalent load is an impedance instead of a pure resistance.

Since the battery charging is a slow process compared with the operating period of the IPT converter, the battery 127 is modeled as a resistor determined by charging voltage and charging current, i.e., $$R_L = \frac{V_O}{I_O}.$$

The SAR 122 together with the resistive load can be represented by an equivalent impedance, given by $$Z_{eq} = R_{eq} + jX_{eq}, \quad (1)$$

$$\text{where } R_{eq} = \frac{8}{\pi^2} R_L \sin^4\left(\frac{\theta}{2}\right) \quad (2)$$

$$\text{and } X_{eq} = -\frac{8}{\pi^2} R_L \sin^3\left(\frac{\theta}{2}\right) \cos\left(\frac{\theta}{2}\right) \quad (3)$$

are equivalent resistance and capacitive reactance, respectively.

Figure 3:
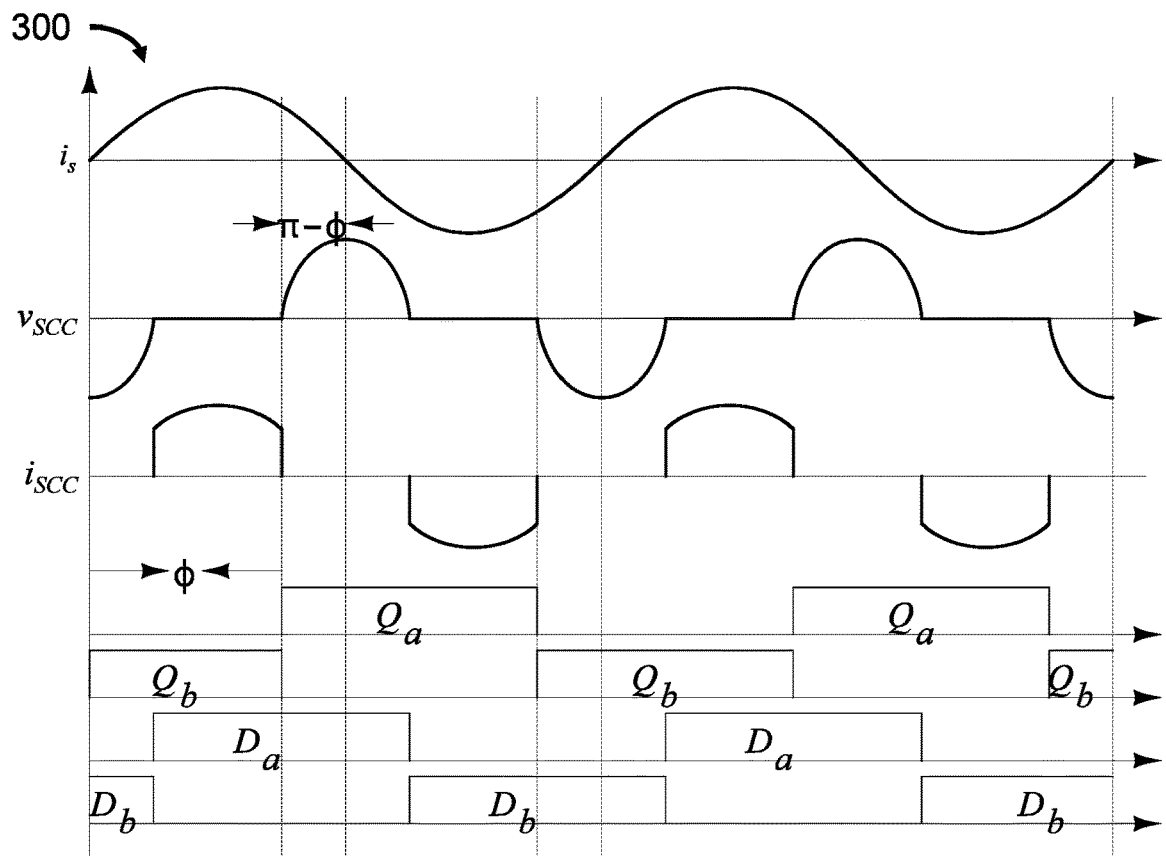
FIG. 3 shows switching sequences and operation waveforms of a switch-controlled capacitor (SCC) in accordance with an example embodiment.

FIG. 3 shows switching sequences and operation waveforms 300 of an SCC in accordance with an example embodiment.

As shown in FIG. 3, the switches $Q_a$ and $Q_b$ in the SCC 121 are synchronized with the AC current $i_S$, and have a control angle $\varphi$ with the zero-cross point of is. Both switches $Q_a$ and $Q_b$ are turned on for half a cycle and they are complements of each other. $Q_a$ and $Q_b$ are turned on and off at zero voltage of $v_{SCC}$.

The equivalent impedance of the SCC 121, i.e., $X_C{}^{scc}$, can be calculated by considering the fundamental components of $i_S$ and $v_{SCC}$, which is represented as equation (4), and can be approximated by equation (5) using quadratic curve fitting, $$X_{C_{CSS}} = \left(2 - \frac{2\varphi - \sin 2\varphi}{\pi}\right) X_{C_2} \qquad (4)$$

$$\approx \frac{4(\varphi - \pi)^2}{\pi^2} X_{C_2}, \qquad (5)$$

where $X_{C_{CSS}} = -\frac{1}{\omega C_{CSS}}$ and $X_{C_2} = -\frac{1}{\omega C_2}$.

Figure 4:
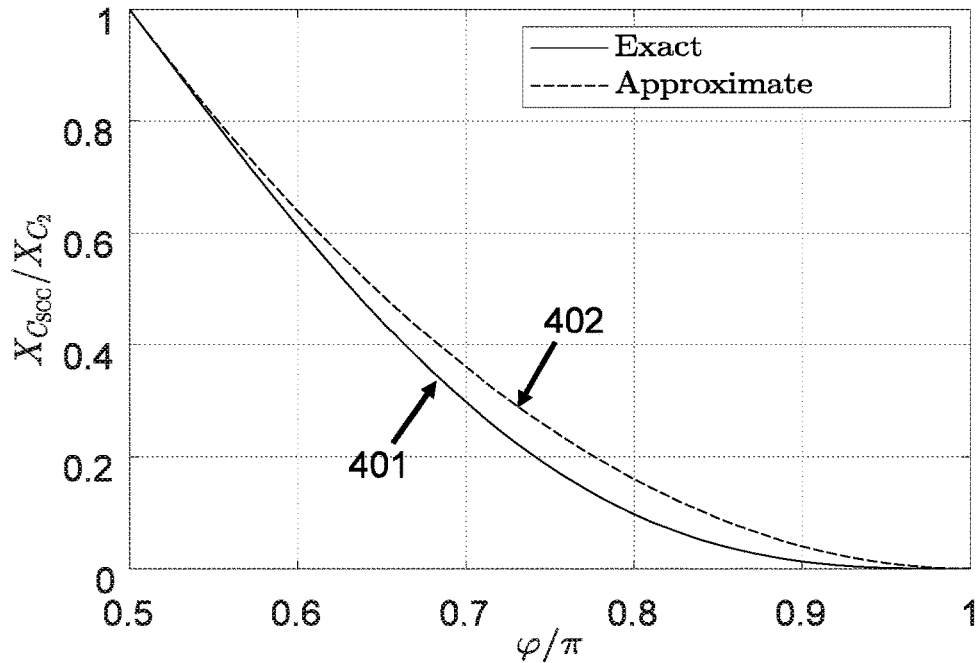
FIG. 4 shows equivalent impedance versus the control angle of the SCC in accordance with an example embodiment.

FIG. 4 shows a graph 400 illustrating equivalent impedance versus the control angle of the SCC in accordance with an example embodiment.

In FIG. 4, the exact relationship between $X_C{}^{scc}$ and $\varphi$ is shown by curve 401 and the approximate relationship therebetween is shown by curve 402. As shown, $X_C{}^{css}$ can be modulated from a nominal reactance $X_{C^2}$ to zero when $\varphi$ varies from $0.5\pi$ to $\pi$.

Figure 5:
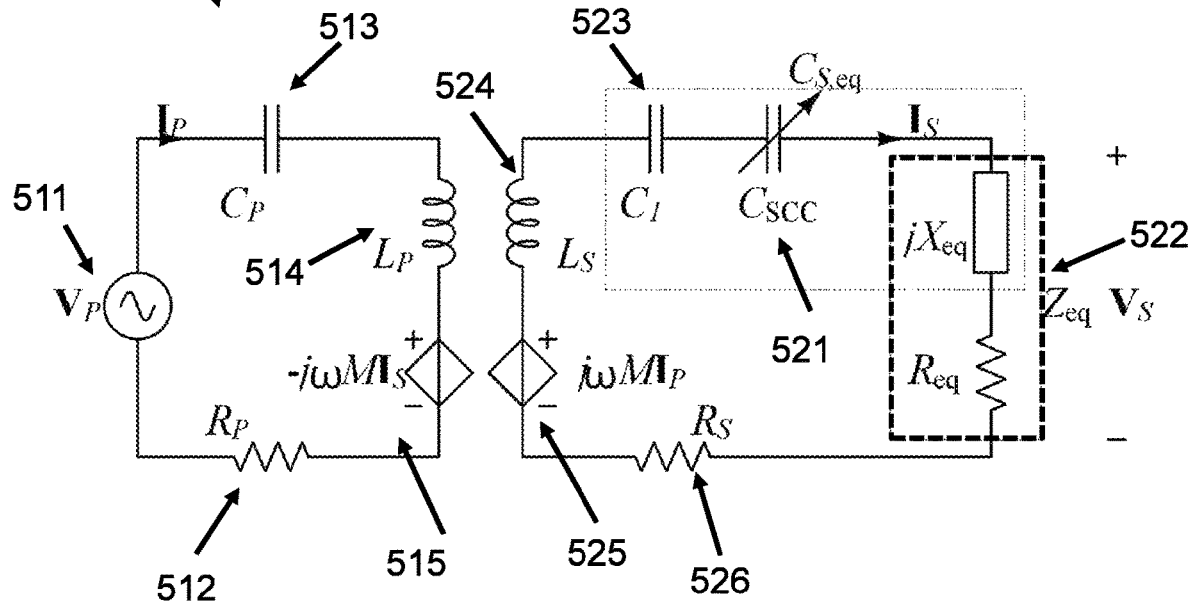
FIG. 5 shows an equivalent wireless power transmission circuit in accordance with an example embodiment.

FIG. 5 shows an equivalent power transmission circuit 500 in accordance with an example embodiment.

The equivalent circuit in FIG. 5 is a sufficiently accurate simplification for the circuit in FIG. 1 operating at near resonant frequency with a variable load resistance. The primary side includes the AC power source 511, the resistor 512, the primary compensation capacitor 513 with capacitance $C_p$, and the primary inductor 514 that are connected in series. The primary side has an electromotive force (emf) 515. The resistor 512 has equivalent resistance of $R_P$ that includes losses from the primary coil 114 and the inverter 112.

The secondary side includes the secondary inductor 524, the secondary compensation capacitor 523, the variable capacitor 521, and the load 522 that are connected in series. The secondary side has an induced AC power source 525. The load 522 is equivalent to the impedance of the battery 127 that is regulated by the SAR 127. The variable capacitor 521 has a capacitance of $C_{scc}$, which is equivalent to the capacitance of the SCC 121. The load 522 is represented by an equivalent impedance $Z_{eq}$ with resistance $R_{eq}$ in series with reactance $X_{eq}$ as analyzed above and depicted in equation (1). The resistor $R_S$ includes losses from the secondary coil 124, the SCC 121 and the SAR 122.

By way of example, variables $V_P$, $I_P$, $V_S$ and $I_S$ are used to represent phasors of the fundamental components of $v_P$, $i_P$, $v_S$ and $i_S$, respectively. $C_1$, $C_{SCC}$ and $X_{eq}$ donate capacitive reactance in the secondary side, which can be represented by an equivalent secondary compensation capacitance $C_{S,eq}$ satisfying $$X_{C_{S,eq}} = -\frac{1}{\omega C_{S,eq}} = X_{C_1} + X_{C_{3CC}} + X_{eq}. \qquad (6)$$

Therefore, the equations for the equivalent circuit in FIG. 5 includes:

$$(R_P + jK_{L_P} + jX_{C_P})I_P - jX_M I_S = V_P, \qquad (7)$$

$$-(R_S + R_{eq} + jX_{L_S} + jX_{C_{S,eq}})I_S + jX_M I_P = 0, \qquad (8)$$

where $X_M$ is the mutual reactance of the magnetic coupler 130, $X_{L_P}$ is the inductive reactance of the primary side of the circuit 500, and $X_{C_P}$ is the capacitive reactance of the primary side of the circuit 500, $$X_M = \omega M, \quad X_{L_P} = \omega L_P, \quad X_{C_P} = -\frac{1}{\omega C_P}$$

and $X_{LS} = \omega L_S$. The magnitudes of $V_P$, $V_S$ and $I_S$ are given by $$|V_P| = \frac{4}{\pi} V_1, \qquad (9)$$

$$|V_S| = \frac{4}{\pi} \sin\left(\frac{\theta}{2}\right) V_O, \qquad (10)$$

$$|I_S| = \frac{\pi}{2} \frac{I_O}{\sin^2\left(\frac{\theta}{2}\right)}. \qquad (11)$$

According to the equivalent circuit in FIG. 5, the efficiency can be calculated by $$\eta = \frac{|I_S|^2 R_{eq}}{|I_S|^2 R_{eq} + |I_S|^2 R_S + |I_P|^2 R_P} \qquad (12)$$

$$= \frac{X_M^2 R_{eq}}{\left[(R_{eq} + R_S)^2 + \left(X_{L_S} + X_{C_{S,eq}}\right)^2\right] R_P + X_M^2 (R_{eq} + R_S)}$$

Given a chosen operating frequency $\omega$, the efficiency in (12) can be maximized as $$\eta_{max} \approx \frac{1}{\frac{2}{\frac{X_M}{R_P R_S}} + 1} \qquad (13)$$

when $$X_{L_S} + X_{C_{S,eq,opt}} = 0, \qquad (14)$$

$$\text{and } R_{eq,opt} = X_M \sqrt{\frac{R_S}{R_P}}, \qquad (15)$$

with the assumptions $$\frac{X_M}{R_P R_S} \gg 1 \text{ and } \frac{R_{eq}}{R_S} > 1.$$

The variables $X_{CS,eq,opt}$ and $R_{eq,opt}$ are the optimum values of $X_{CS,eq}$ and $R_{eq}$ leading to maximum efficiency, respectively.

According to equation (15), the battery resistance $R_L$, which varies in a wide range, should be transformed into a matched load resistance $R_{eq,opt}$ by the SAR 122 in order to achieve the maximum efficiency. Therefore, the conduction angle $\theta$ of the SAR is calculated from equation (2) and (15) as $$\theta = 2\arcsin\left(\sqrt[4]{\frac{R_{eq,opt}}{\frac{8}{\pi^2} R_L}}\right). \qquad (16)$$

According to equation (3), the change of $\theta$ also affects the load reactance $X_{eq}$, which is expressed as:

$$X_{eq} = -R_{eq,opt} \cot\left(\frac{\theta}{2}\right). \quad (17)$$

Simulations has been done to verify the analysis set forth as above and follows. The simulation parameters are listed in the table 700 in FIG. 7 and are used for all simulations in the description unless specified otherwise.

Figure 6A:
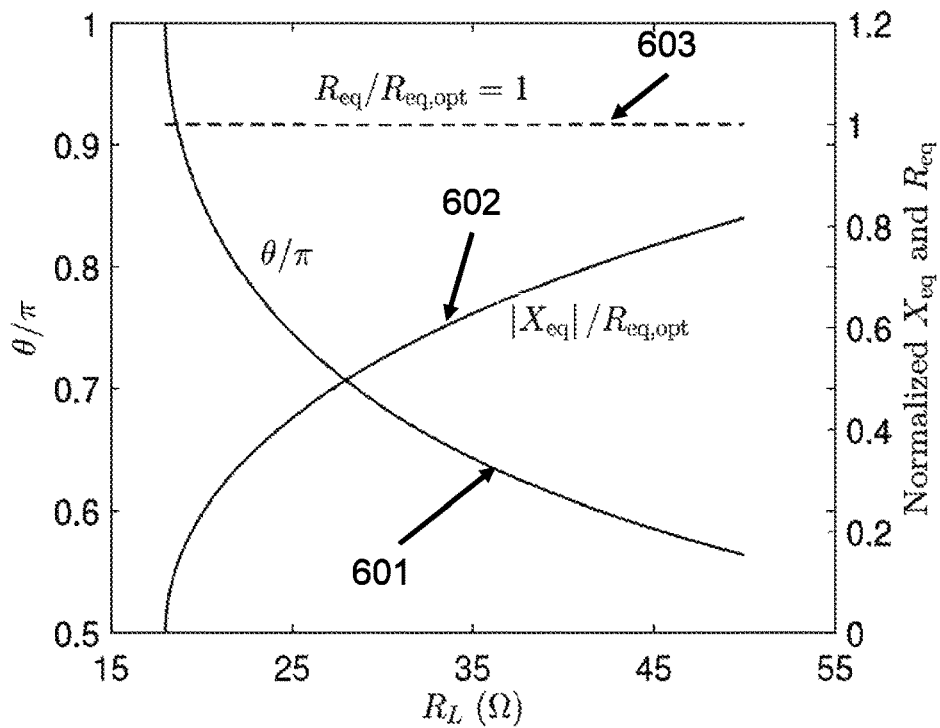
FIG. 6A shows conduction angle of SAR and equivalent load impedance versus load resistance in accordance with an example embodiment.

FIG. 6A shows a graph 600A of conduction angle, normalized $R_{eq}$, normalized $X_{eq}$ versus load resistance in accordance with an example embodiment.

In FIG. 6A, the curve 601 shows the change of the conduction angle θ of the SAR with regard to $R_L$ to achieve optimum load resistance in a simulation. As indicated by the line 603, by controlling the conduction angle θ of the SAR, the equivalent load resistance $R_{eq}$ can be kept to the optimum load resistance $R_{eq,opt}$. However, the magnitude of $X_{eq}$ becomes larger with the decrease of θ, as shown in the curve 602.

According to equation (14), one of the conditions to achieve maximum efficiency is that the equivalent secondary compensation capacitance $C_{S,eq}$ fully compensates the secondary self-inductance $L_S$ at the operating frequency, that is, the equivalent capacitive reactance $X_{CS,eq}$ should be constant at $X_{CS,eq,opt} = -X_{LS}$. Therefore, the variation of $X_{CS,eq}$ caused by $X_{eq}$ should be offset by $X_{C_{SCC}}$. Considering equation (5), (6) and (17), control angle φ of the SCC can be derived as $$\varphi \approx \pi - \frac{\pi}{2}\sqrt{\frac{|X_{C_{S,eq,opt}}| - |X_{C_1}| - |X_{eq}|}{|X_{C_2}|}}. \quad (18)$$

Figure 6B:
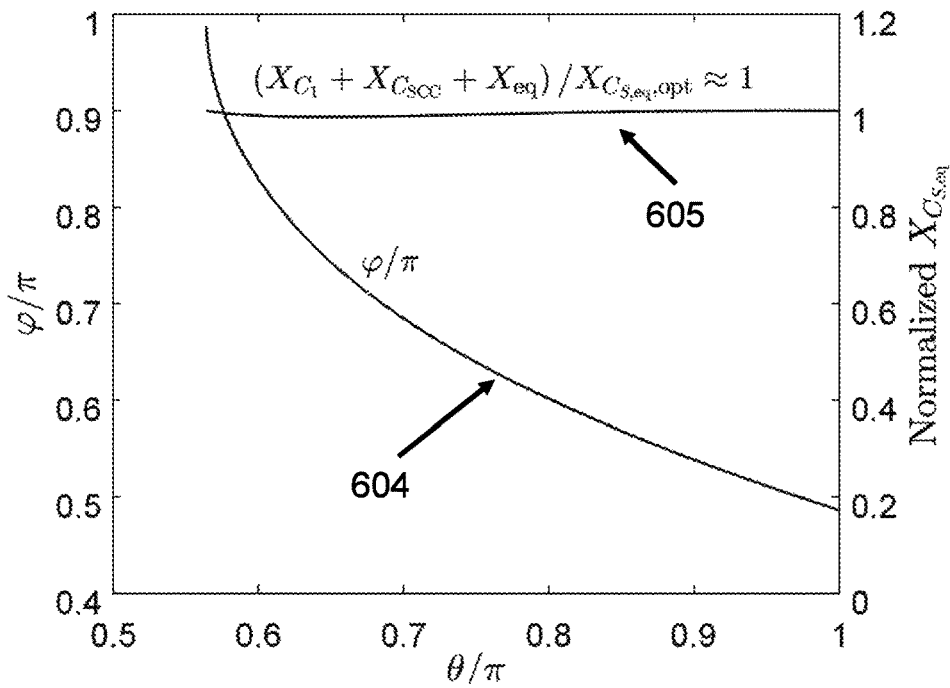
FIG. 6B shows control angle of SCC and equivalent secondary capacitance versus conduction angle of SAR in accordance with an example embodiment.

FIG. 6B shows a graph 600B of the control angle φ of SCC, normalized $X_{CS,eq}$ versus conduction angle θ of SAR in accordance with an example embodiment.

In FIG. 6B, the curve 604 shows a coordinated control of φ with respect to θ in a simulation. As can be seen in the curve 605, $X_{CS,eq}$ is kept almost constant at the optimum value of $X_{CS,eq,opt}$ as illustrated, so that maximum efficiency can be achieved.

As described above, maximum efficiency can be achieved over a wide range of battery resistance by matching an optimum load resistance and maintaining a null reactance in the secondary side of the IPT charging circuit. Also, it is known that an IPT system can achieve load-independent output current if operating with a null reactance. Therefore, with the merits of load-independent characteristic and matching load impedance, an IPT circuit can achieve both constant power output and maximum efficiency.

Figures 7, 8:
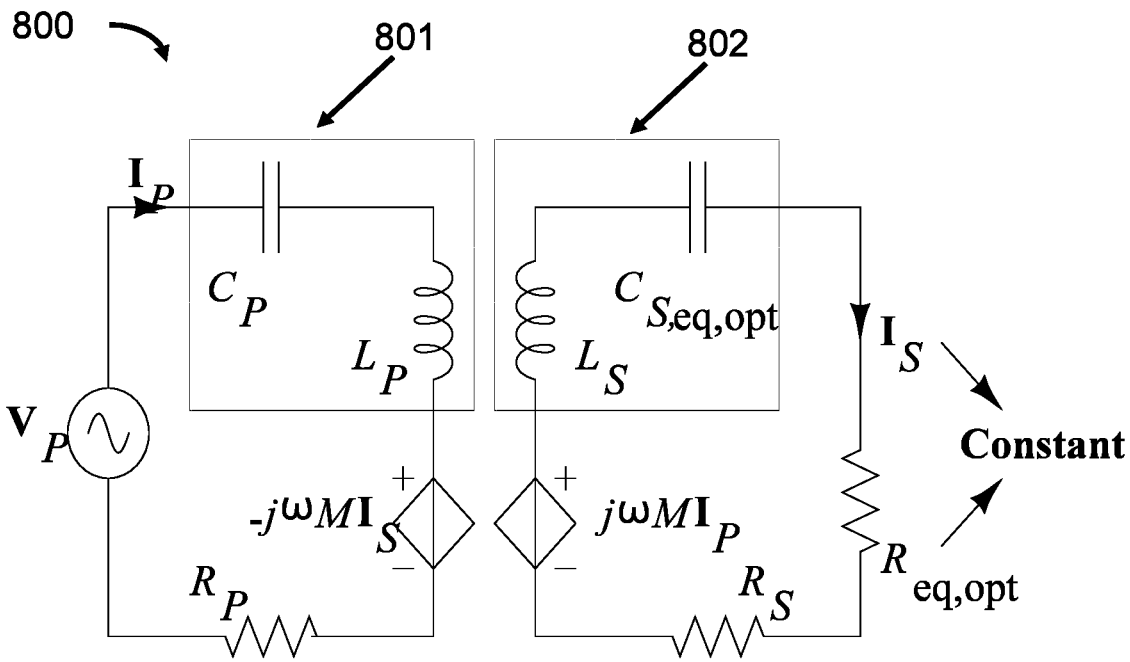
FIG. 7 shows a table of simulation parameters in accordance with an example embodiment.
FIG. 8 shows an equivalent wireless charging circuit with constant power output and maximum efficiency in accordance with an example embodiment.

FIG. 8 shows an IPT circuit 800 that can achieve both constant power output and maximum efficiency.

In the IPT circuit 800, the primary side 801 and the secondary side are working at a fixed resonant frequency ω. The reactance of the secondary side 802 is null and the load resistance is maintained at the optimum value $R_{eq,opt}$. According to equation (15), the optimum load resistance $R_{eq,opt}$ is approximately constant. Theoretically, if component losses are neglected, given an input voltage $v_p$ to the primary coil, the magnitude of the load-independent output current $i_S$ is given by $$|I_S| \approx \frac{|V_P|}{X_M}. \quad (19)$$

Therefore, the IPT circuit 800 outputs a constant output power at maximum efficiency, given by $$P_{o,constant} \approx |I_S|_{RMS}^2 R_{eq,opt}, \quad (20)$$

where the subscript RMS represents the root mean square (RMS) value of the corresponding variable.

Combining equation (9)-(11), (19) and (20), the constant charging power, DC charging voltage, and DC charging current at the maximum efficiency can be expressed as:

$$P_{0,constant} = \frac{8}{\pi^2} \frac{V_I^2}{\omega M} \sqrt{\frac{R_S}{R_P}}, \quad (21)$$

$$V_O = \frac{V_I}{\sin^2\left(\frac{\theta}{2}\right)} \sqrt{\frac{R_S}{R_P}}, \text{ and} \quad (22)$$

$$I_O = \frac{8}{\pi^2} \frac{V_I}{\omega M} \sin^2\left(\frac{\theta}{2}\right), \quad (23)$$

respectively.

Assumed that the equivalent load impedance $X_{eq}$ can be offset by the proper control of SCC impedance $X_{C^{SCC}}$, the output power $P_O$ is solely determined by the equivalent load resistance $R_{eq}$, given by $P_O \approx |I_S|^2_{RMS} R_{eq}$. According to equation (2), the equivalent load resistance $R_{eq}$ can be modulated by controlling the conduction angle θ. Therefore, $P_O$ takes a monotonic relationship with the control variable θ.

Figure 9:
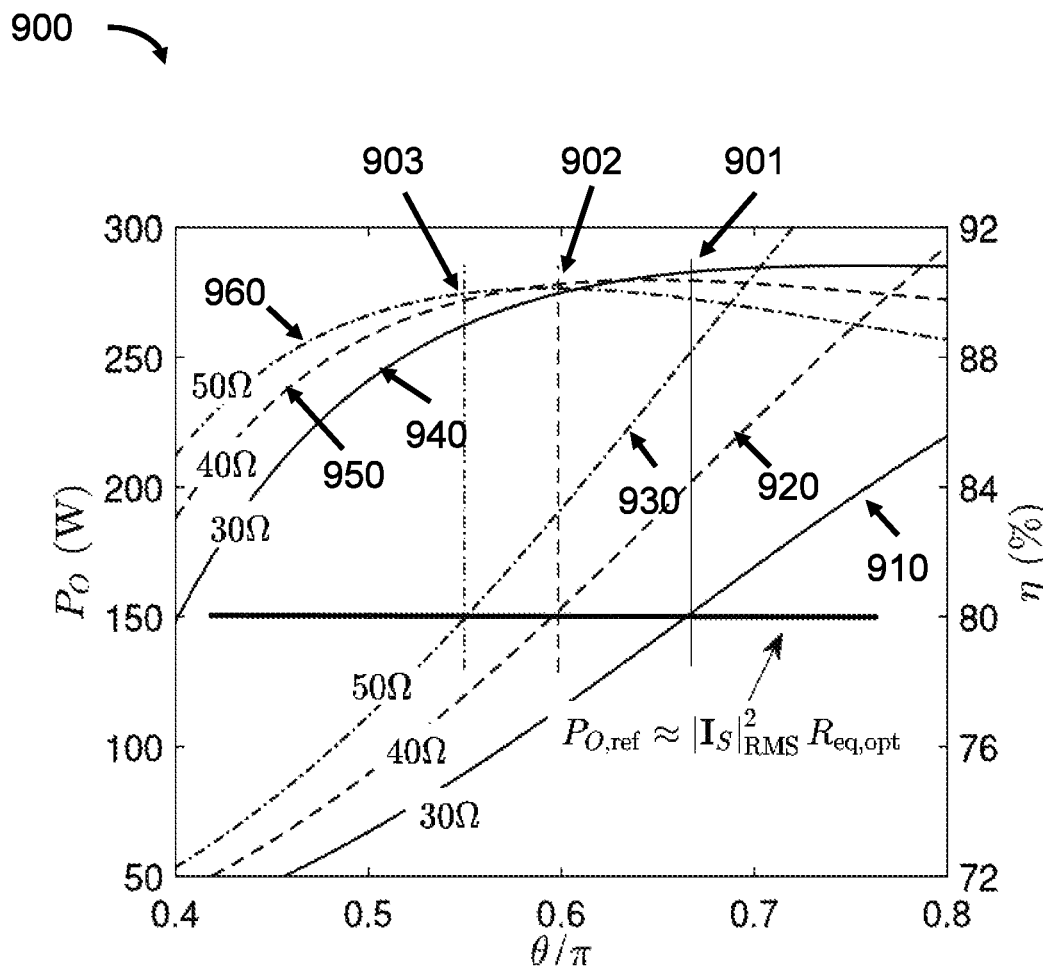
FIG. 9 shows output power and efficiency of the charging circuit versus conduction angle of SAR in accordance with an example embodiment.

FIG. 9 shows a graph 900 of the output power and efficiency of the charging circuit versus conduction angle of SAR in accordance with an example embodiment.

As in FIG. 9, the output power $P_O$ versus θ are illustrated by monotonic curves 910, 920, and 930, and the efficiency η versus θ are illustrated by monotonic curves 940, 950, 960 for various values of battery resistance $R_L$ 30Ω, 40Ω, and 50Ω, respectively. When $P_O$ is constant at $P_{O,constant}$ as in equation (20), the charging circuit operates at its optimized efficiency as shown by the points 901, 902 and 903 respectively. Therefore, a controller can be used to achieve constant output power and maintain maximum efficiency, with $P_{O,constant}$ in (20) being a control reference $P_{O,ref}$.

Figure 10:
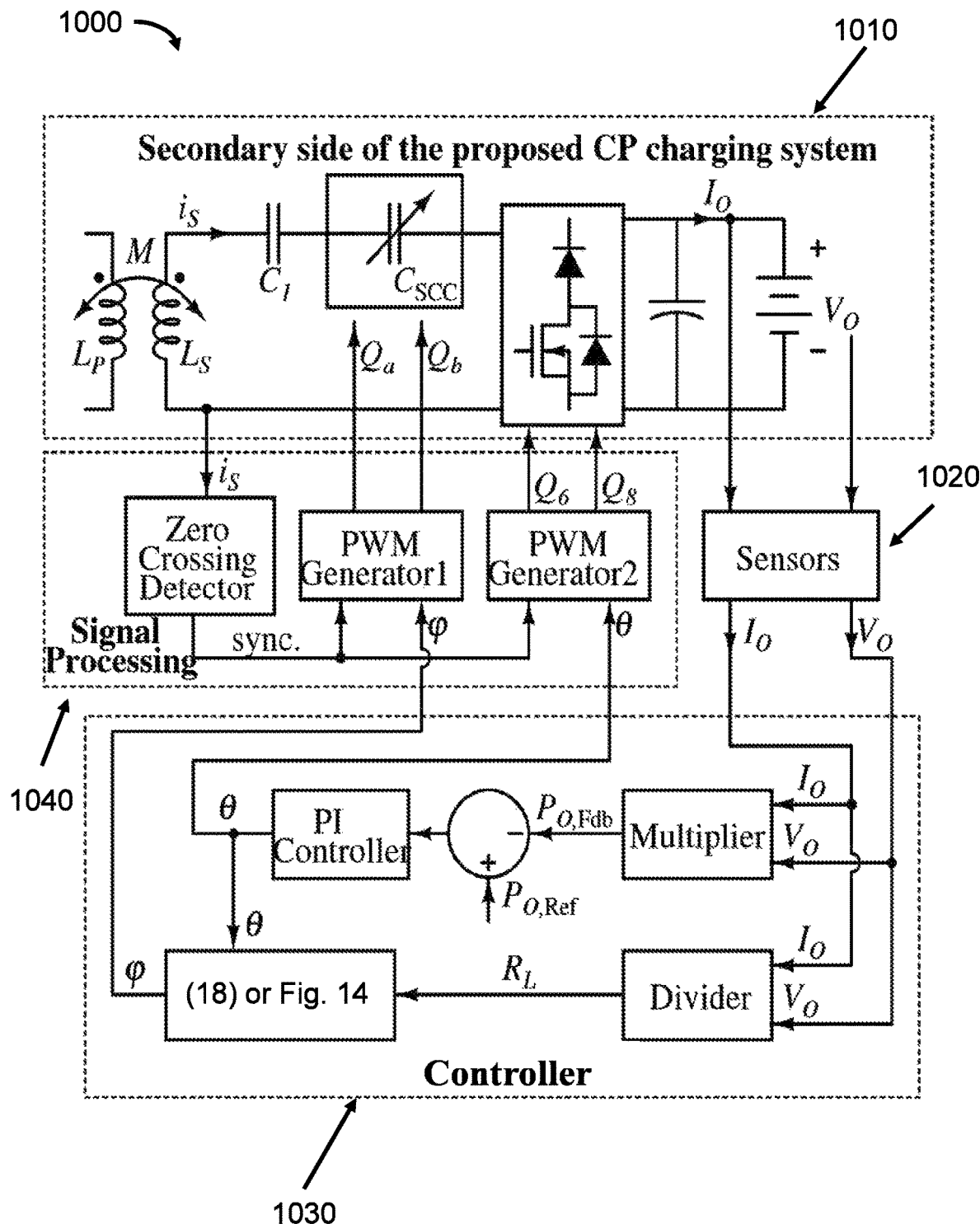
FIG. 10 shows a wireless charging system in accordance with an example embodiment.

FIG. 10 shows a wireless charging system 1000 in accordance with an example embodiment.

The wireless charging system 1000 includes a wireless charging circuit 1010 for charging a battery, a plurality of sensors 1020 for measuring the charging voltage $V_O$ and the charging current $I_O$, a signal processing unit 1040 for providing control signals to the wireless charging circuit 1010 and a controller 1030 for calculating the control angles for the control signals. The wireless charging circuit 1010 further includes an SCC and an SAR that can be regulated by the control signals. For example, the wireless charging circuit 1010 is the circuit 100 depicted in FIG. 1.

In one example embodiment, the charging voltage $V_O$ and the charging current $I_O$ are measured by the sensors 1020, and input into a multiplier and a divider in the controller 1030 for calculating the charging power $P_O$ and the load resistance $R_L$ respectively. The controller 1030 further realizes a Proportional Integral (PI) controller that applies correction to the difference between the charging power $P_O$ and a reference power $P_{O,ref}$ and forms a conduction angle θ for the SAR. Meanwhile, with θ and $R_L$, the control angle of the SCC φ is calculated according to equation (18). The angles φ and θ are used to produce driving signals for the SCC and the SAR respectively by the signal generators in the signal processing unit 1040. For example, the driving signals are PWM signals. The signal processing unit 1040 also includes a zero crossing detector for detecting the zero crossing of $i_S$ and generates a synchronization signal for the signal generators.

In one example embodiment, the controller 1030 is a microcontroller/microprocessor that can perform control algorithms.

In one example embodiment, the controller 1030 includes one or any combinations of a Proportional controller, an Integral controller, and a Derivative controller.

In one example embodiment, the reference power $P_{O,ref}$ is determined as the constant charging power in equation (21).

In one example embodiment, the control angle of the SCC $\varphi$ is calculated according to a measured relationship between $\varphi$ and $\theta$.

In one example embodiment, the driving signals for the SCC and the SAR are both generated by one signal generator.

Since the operating frequency in the primary side of the circuit is fixed and only impedance control in the secondary side is needed for constant power output and maximum efficiency, wireless feedback communication between the primary side and the secondary side is not necessary, so that the circuit design is simplified and the loss in the secondary side is minimized.

Figure 11:
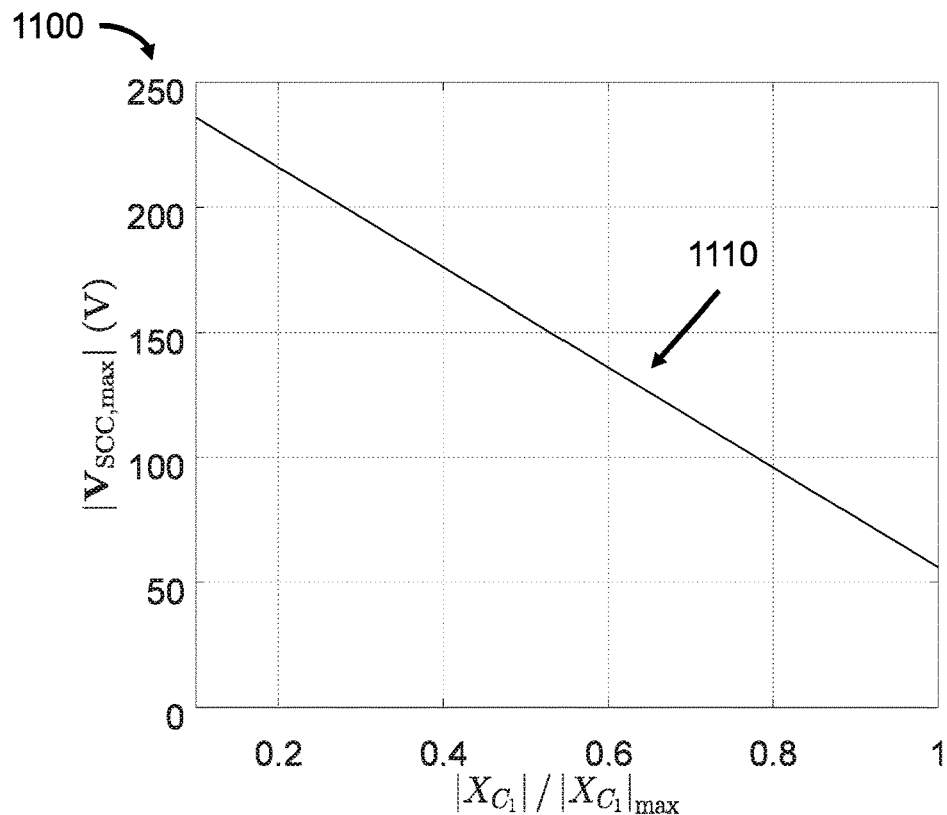
FIG. 11 shows voltage stress of SCC in accordance with an example embodiment.

FIG. 11 shows a graph 1100 of voltage stress of SCC vs. the capacitance C1 of the secondary compensation capacitor.

According to equation (3) and (5), $|X_{eq}|$ ranges from a minimum value $|X_{eq}|_{min}$ to a maximum value $|X_{eq}|_{max}$ depending on the battery resistance $R_L$, and $|X_{CSCC}|$ ranges from zero to $|X_{C2}|$ with the control angle $\varphi$ varying from $\pi$ to $0.5\pi$. $X_{CSCC}$ is controlled to offset the variation of $X_{eq}$, so that $X_{CS,eq}$ can be maintained at an optimum value of $X_{CS,eq,opt}$ to fully compensate $X_{LS}$.

According to equation (14), $C_1$ is required to full compensate the reactance in the secondary side, that is:

$$|X_{C_1}|+|X_{C_2}|+|X_{eq}|_{min} \geq |X_{C_S,eq,opt}|, \quad (24)$$

$$|X_{C_1}|+|X_{eq}|_{max} \leq |X_{C_S,eq,opt}|. \quad (25)$$

The voltage stress of the SCC switches is determined by the maximum voltage across the SCC, i.e., $$|V_{SCC,max}|=|X_{C2}||I_S|. \quad (26)$$

To reduce the voltage stress of the SCC switches, $|X_{C2}|$ should be minimized. Therefore, according to equation (24), $|X_{C1}|$ should be maximized. Combining with equation (25), the maximum value of $|X_{C1}|$ is derived as:

$$|X_{C_1}|_{max}=|X_{C_S,eq,opt}|-|X_{eq}|_{max}. \quad (27)$$

The curve 1110 in FIG. 11 shows the relationship between the voltage stress $\|V_{SCC,max}|$ and the reactance value of $|X_{C1}|$, in which the voltage stress is significantly reduced with a large $|X_{C1}|$.

The maximum current stress of the SCC occurs when the control angle of the SCC is maximum, i.e., $\varphi=\pi$, as in this situation, the capacitor $C_2$ in the SCC is shortened by the switches $Q_a$ and $Q_b$. Since the output current $i_S$ is constant according to equation (19), maximum current stress of the SCC switches are given by $$|I_{SCC,max}|=|I_S|. \quad (28)$$

Figure 12:
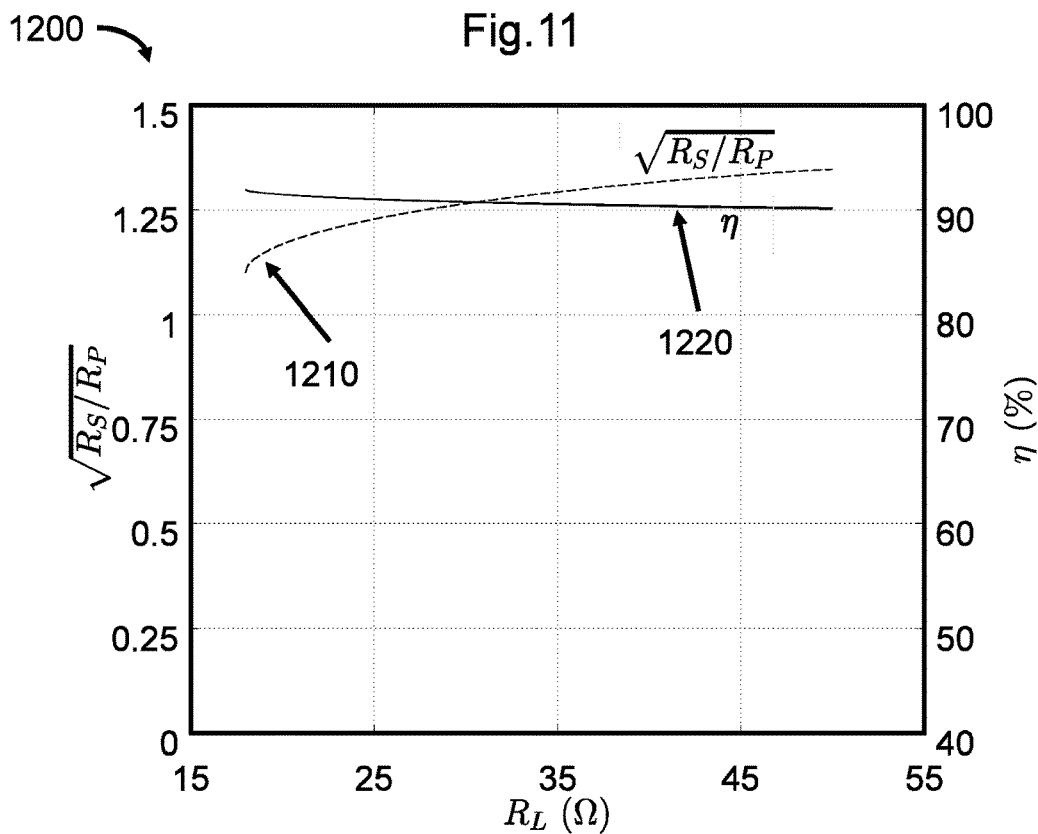
FIG. 12 shows loss resistance ratio and efficiency versus equivalent battery resistance in accordance with an example embodiment.

FIG. 12 shows a graph 1200 of loss resistance ratio and efficiency versus equivalent battery resistance in accordance with an example embodiment.

In one example embodiment, the charging system operates with zero phase angle between the input voltage $v_P$ and the input current $i_P$ at the primary side.

In a preferred example embodiment, the input impedance is slightly inductive to facilitate ZVS of the switches $Q_1$-$Q_4$ for switching loss reduction. A slight decrement of the primary frequency $\omega_P$ is used to fulfill the requirement, which does not affect the output and the efficiency too much. Therefore, $R_P$ representing the primary-side losses can be estimated by considering the primary-side coil resistance and the conduction losses of the inverter switches, given by $$R_P=R_{P,w}+2R_{on,1}, \quad (29)$$

where $R_{on,1}$ is the conduction resistance of the inverter switches $Q_1$-$Q_4$. $R_P$ can be considered as constant.

As both the SCC switches $Q_a$ and $Q_b$ are soft switched, the conduction loss in the SCC switches can estimated as $$P_{SCC}=I_{SCC,RMS}^2 R_{on,2}+I_{SCC,avg}V_{f,2}, \quad (30)$$

where $R_{on,2}$ and $V_{f,2}$ are the on-resistance and body-diode forward voltage of the switches $Q_a$-$Q_b$, respectively. $I_{SCC,RMS}$ and $I_{SCC,avg}$ are the RMS value and average value of the current flowing through the SCC switches $Q_a$-$Q_b$, given by $$I_{SCC,RMS} = \sqrt{\frac{1}{\pi}\int_{\pi-\varphi}^{\varphi}(|I_S|\sin x)^2 \, dx} \quad (31)$$

$$I_{SCC,avg} = \frac{1}{\pi}\int_{\pi-\varphi}^{\varphi} |I_S|\sin x \, dx \quad (32)$$

respectively.

Similarly, neglecting the small switching loss due to ZVS of the SAR switches Q6 and Q8, the conduction loss in the SAR can be estimated as $$P_{SAR}=i_{S,RMS}^2 R_{on,3}+i_{S,avg}V_{f,3}, \quad (33)$$

where $R_{on,3}$ is the on-resistance of the MOSFET switches $Q_6$ and $Q_8$, and $V_{f,3}$ is the forward voltage of the diodes $D_5$-$D_8$. $i_{S,RMS}$ and $i_{S,avg}$ are the RMS value and average value of $i_S$ injecting into the SAR, where $$i_{S,RMS} = \frac{|I_S|}{\sqrt{2}} \text{ and } i_{S,avg} = \frac{2|I_S|}{\pi},$$

respectively.

Incorporating the losses in the SCC and the SAR, equivalent series resistance $R_S$ representing the losses in the secondary-side can be calculated as $$R_S = R_{S,w} + \frac{P_{SCC}+P_{SAR}}{i_{S,RMS}^2}. \quad (34)$$

In FIG. 12, the loss resistance ratio $$\sqrt{\frac{R_S}{R_P}}$$

is simulated and shown by the curve 1210. The ratio varies from 1.1 to 1.3 with respect to the battery resistance $R_L$. According to equation (15), the optimum load resistance $R_{eq,opt}$ vary with the variation of $$\sqrt{\frac{R_S}{R_P}}.$$

However, slight deviation from the optimum load resistance does not affect the efficiency too much. In one example embodiment, $R_{eq,opt}$ is fixed at a value as in FIG. 7 for simplicity. The simulated efficiency is shown by the curve 1220, which slightly decreases mainly due to the increase of $R_S$. Nevertheless, the efficiency is approximately maintained maximum over the entire load range.

FIG. 13 shows a table 1300 of parameters for a charging circuit in accordance with an example embodiment.

To verify the CP output and maximum-efficiency performance throughout the charging process, a charging circuit is implemented with the parameters given in the table 1300. According to the charging specifications, the equivalent battery resistance approximately ranges from 18Ω to 50Ω. An electronic load is used to emulate the equivalent battery resistance. The input DC power and output DC power are measured by a Yokogawa PX8000 Precision Power Scope.

Figure 14:
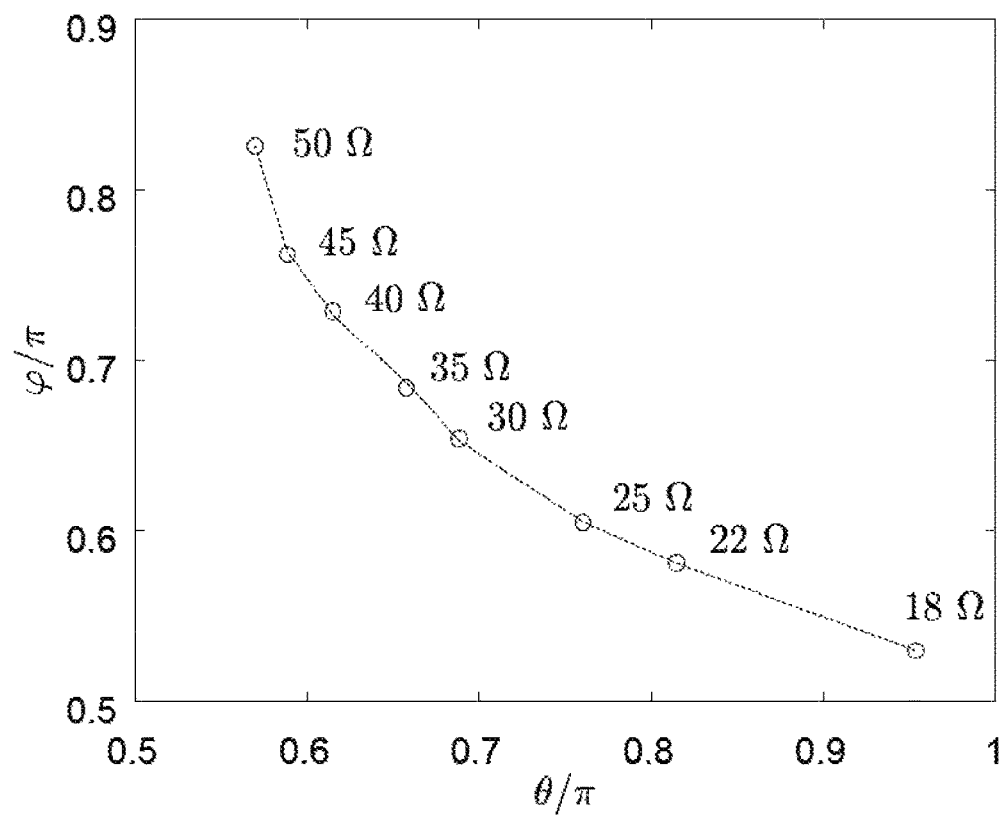
FIG. 14 shows measured operation points and the corresponding battery resistance in accordance with an example embodiment.

The operating frequency of the inverter is fixed at 85 kHz. The conduction angle θ of the SAR and the control angle φ of the SCC are adjusted to achieve $C_P$ output and maintain maximum efficiency. The measured operating points (marked with "o") are shown in the graph 1400 in FIG. 14, with φ varying from 0.53π to 0.83π and θ from 0.95π to 0.57π, respectively.

Figure 15A:
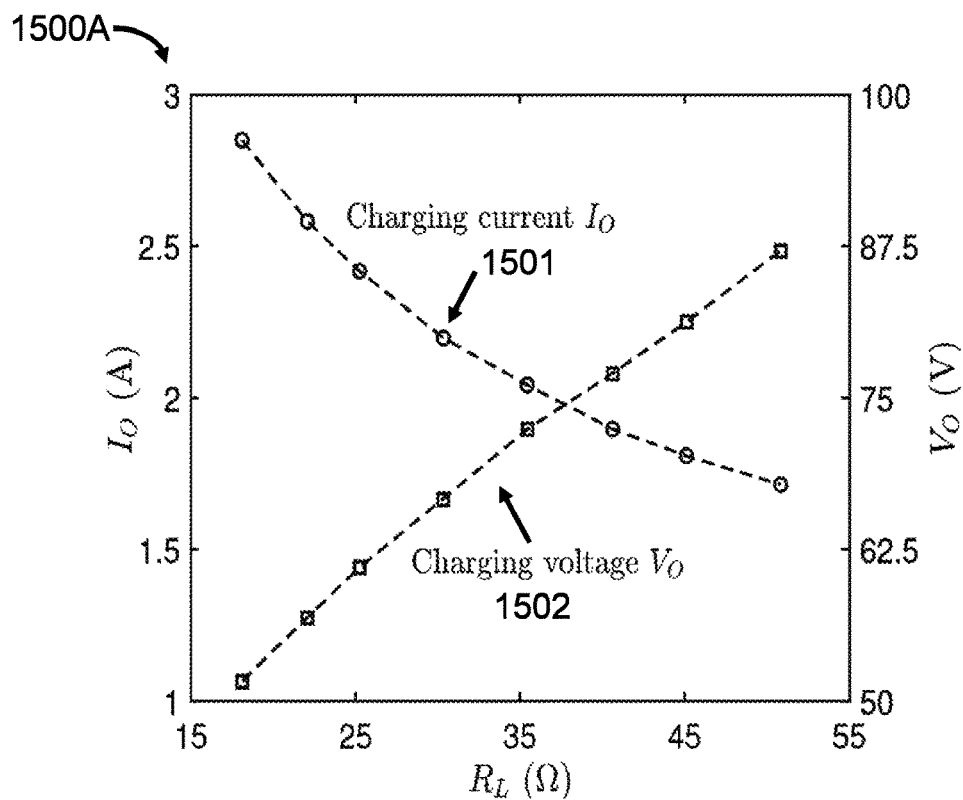
FIG. 15A shows measured output current and voltage versus battery resistance in accordance with an example embodiment.
Figure 15B:
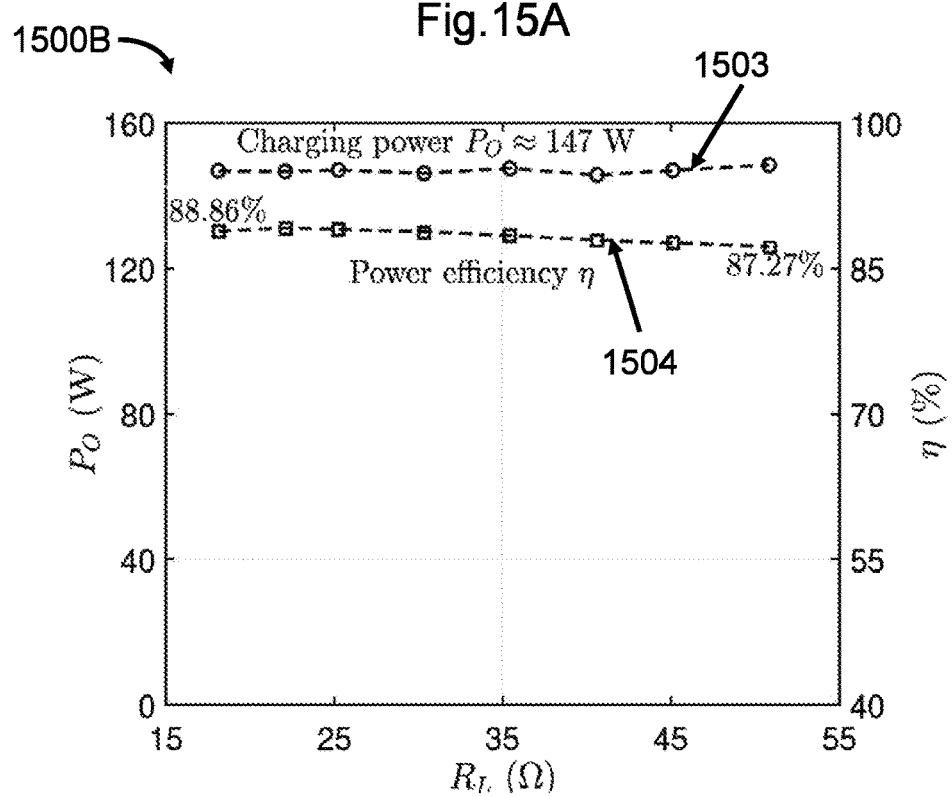
FIG. 15B shows measured output power and efficiency versus battery resistance in accordance with an example embodiment.

FIG. 15A shows a graph 1500A of measured output current and voltage versus battery resistance. FIG. 15B shows a graph 1500B of measured output power and efficiency versus battery resistance.

In FIG. 15A, the corresponding charging current shown in the curve 1501 varies inversely with respect to the charging output voltage shown in the curve 1502. The corresponding output power shown in the curve 1503 is approximately constant at 147 W, while the maximum efficiency is maintained at around 88%, as shown in the curve 1504. The experimental results in FIGS. 15A and 15B confirms that the wireless charging circuit can achieve CP charging and maximum efficiency throughout the charging process.

In one example embodiment, waveforms of the inverter, the SCC and the SAR are measured at the start, the middle and the end of CP charging. The experimental results shows that ZVS is achieved for the inverter, the SCC and the SAR. The maximum voltage stress of the SCC switches is about 55 V, which coincides with the analysis as described in equation (26).

Figure 16:
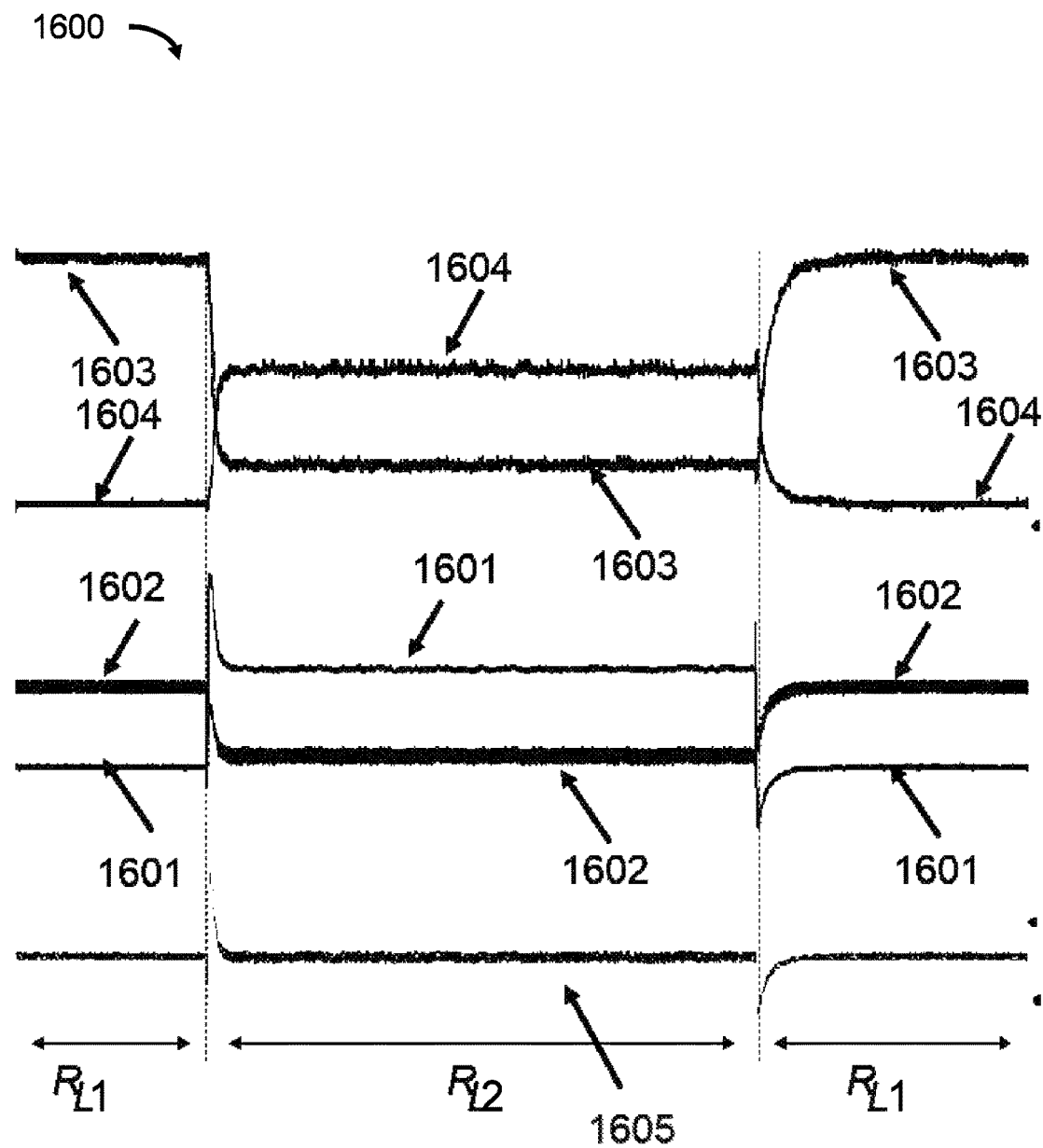
FIG. 16 shows transient waveforms for parameters in a charging circuit in accordance with an example embodiment.

In one example embodiment, the wireless charging system with a closed-loop secondary impedance control system demonstrated in FIG. 10 is implemented in a microcontroller for CP charging and maximum efficiency throughout charging process. Transient waveforms 1600 for step load changing are shown in FIG. 16. The load changes from $R_{L1}$ to $R_{L2}$, and then to $R_{L2}$ again, where $R_{L1}$ is 20Ω and $R_{L2}$ is 40Ω.

In FIG. 16, the output voltage $V_O$ and output current $I_O$ are measured and shown as curve 1601 and 1602, respectively. The control variables are observed from digital-to-analog outputs, where the curve 1603 and 1604 represent the conduction angle θ of the SAR and the control angle φ of the SCC, respectively. $P_O$ is calculated by multiplying $V_O$ and $I_O$ and shown in the waveform 1605. It can be observed that $P_O$ is tightly regulated by direct control of θ, while φ is coordinately controlled with the variation of θ and $R_L$. No wireless communication is needed for the control of the proposed system.

Figure 17:
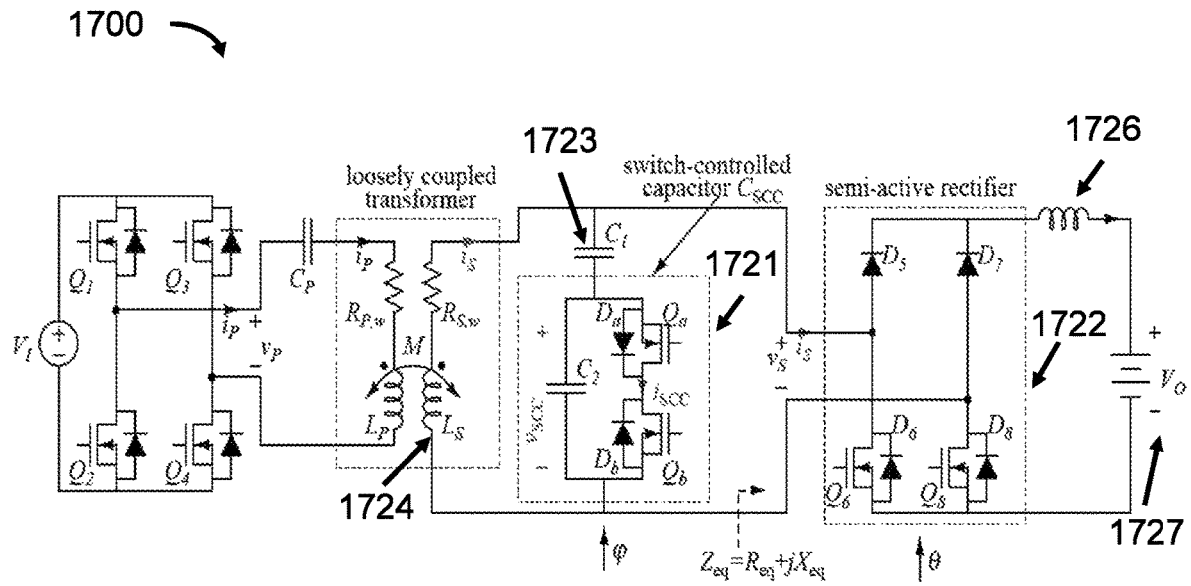
FIG. 17 shows a schematic diagram of a wireless charging circuit in accordance with an example embodiment.

FIG. 17 shows a schematic diagram of a wireless charging circuit 1700 in accordance with an example embodiment.

The wireless charging circuit 1700 in FIG. 17 is a variation of the circuit 100 in FIG. 1. The wireless charging circuit 1700 includes an SCC 1721 and an SAR 1722.

The SCC 1721 consists of a capacitor with a fixed capacitance value $C_2$ and two electronically controllable switches $Q_a$ and $Q_b$. The two electronically controllable switches $Q_a$ and $Q_b$ are connected in series, and further connected with the capacitor $C_2$ in parallel. The SCC 1721 is connected in series with a capacitor with a fixed capacitance value $C_1$. The SCC 1721 and the capacitor $C_1$ are connected in parallel with the secondary coil 1724.

The setting of SAR 1722 is the same with the SAR 122 in FIG. 1. However, due to the change of the setting of SCC 1721 comparing with FIG. 1, a filter inductor 1726 is connected in series with the battery 1727, instead of the filter capacitor 126 in FIG. 1.

Figure 18:
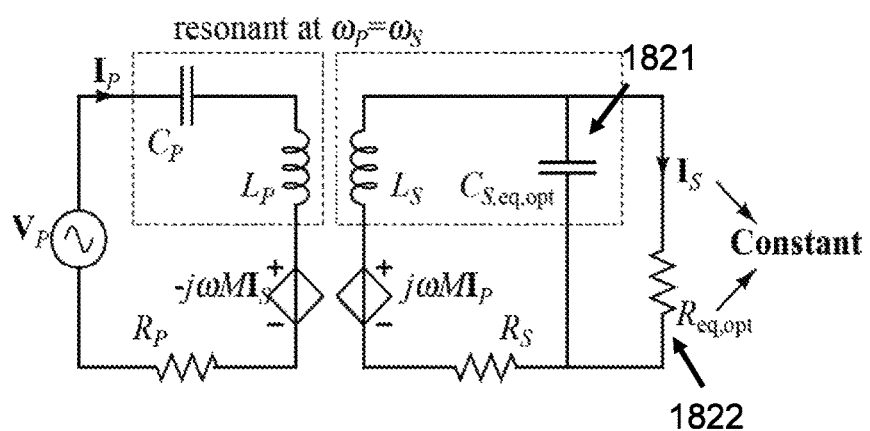
FIG. 18 shows an equivalent wireless power transmission circuit in accordance with an example embodiment.

FIG. 18 shows an equivalent wireless power transmission circuit 1800 in accordance with an example embodiment.

FIG. 18 is an equivalent circuit of the wireless charging circuit 1700. As can be seen, the equivalent circuit 1800 includes an equivalent capacitor 1821 connected in parallel with the equivalent resistor 1822. An optimum reactance $X_{CS,eq,opt}$ of the capacitor 1821 and an optimum resistance $R_{eq,opt}$ of the resistor 1822 can be achieved by regulating the conduction angle of the SAR 1722 and a control angle of the SCC 1721, which counterbalances the reactance of the secondary coil and leads to maximum power transmission efficiency for the circuit 1800.

As used herein and in the claims, "connect" refers to electrical coupling or connection either directly or indirectly via one or more electrical means unless otherwise stated.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

What is claimed is:

1. A wireless power transmission circuit that provides power to a load of variable resistance with an alternating current (AC) power source induced at a secondary coil in a secondary side of the circuit by a primary coil in a primary side of the said circuit, the wireless power transmission circuit comprising:
    a switch-controlled capacitor (SCC) that connects to the AC power source, wherein the SCC comprises a first capacitor connected in parallel with two electrically controllable switches in series; and
    a semi-active rectifier (SAR) that connects to output of the SCC for rectifying the output of the SCC, wherein the SAR comprises a bridge circuit that includes two electrically controllable switches,
    wherein both switches in the SCC are turned on for half a cycle and complement to each other and are turned off with a time delay relative to the zero cross points of the AC power source; the time delay being a control angle of the SCC;

wherein both switches in the SAR are turned on for half a cycle and complement to each other and are turned off with a time delay relative to the zero cross points of the AC power source; that time delay being a conduction angle of the SAR, wherein the control angle of the SCC and the conduction angle of the SAR are regulated to provide load impedance that matches the impedance of the coils, so that the wireless power transmission circuit provides constant power output and enhances the power transmission efficiency.

2. The wireless power transmission circuit of claim 1, wherein the bridge circuit in the SAR has two upper legs and two lower legs, each lower leg comprising an electrically controllable switch and each upper leg comprising a diode, wherein each electrical controllable switch comprises a transistor that drain of each transistor is connected with one upper leg respectively, and sources of the two transistors are connected with each other.

3. The wireless power transmission circuit of claim 1, further comprising a filter capacitor connected in parallel with the load when the SCC is connected in series with the secondary coil.

4. The wireless power transmission circuit of claim 1, further comprising a filter inductor connected in series with the load when the SCC is connected in parallel with the secondary coil.

5. The wireless power transmission circuit of claim 1, wherein a maximum efficiency of power transmission is achieved when the conduction angle $\theta$ of the SAR is regulated as $$\theta = 2\arcsin\left(\sqrt[4]{\frac{R_{eq,opt}}{\frac{8}{\pi^2}R_L}}\right),$$

wherein $R_L$ is resistance of the load, $$R_{eq,opt} = X_M\sqrt{\frac{R_S}{R_P}},$$

$X_M$ being mutual reactance of the coils, $R_S$ being equivalent resistance representing loss of the primary side, and $R_P$ being equivalent resistance representing loss of the secondary side.

6. The wireless power transmission circuit of claim 1, further comprising:
a second capacitor that is connected in series with the SCC,
wherein a maximum efficiency of charging is achieved when the control angle $\varphi$ of the SCC is regulated as $$\varphi \approx \pi - \frac{\pi}{2}\sqrt{\frac{|X_{C_S,eq,opt}| - |X_{C_1}| - |X_{eq}|}{|X_{C_2}|}},$$

wherein $X_{CS,eq,opt}$ is calculated as $X_{CS,eq,opt} = X_{LS}$, $X_{LS}$ being self reactance of the secondary coil, $X_{C_1}$ being reactance of the second capacitor, $X_{C_2}$ being reactance of the first capacitor, $X_{eq}$ being equivalent load reactance of the circuit.

7. The wireless power transmission circuit of claim 1, wherein the SCC is equivalent to a variable capacitor that has a capacitive reactance of $X_{C_{CSS}}$, wherein $X_{C_{CSS}}$ is calculated as $$X_{C_{CSS}} \approx \frac{4(\varphi - \pi)^2}{\pi^2}X_{C_2},$$

$\varphi$ being the control angle of the SCC, and $X_{C_2}$ being capacitive reactance of the first capacitor.

8. The wireless power transmission circuit of claim 1, wherein the primary coil operates at a fixed frequency.

9. A wireless charging system that enhances efficiency of the charging a battery with an AC power source induced at the secondary coil in a secondary side of the circuit by a primary coil in a primary side of the circuit, comprising:
a switch-controlled capacitor (SCC) that connects with the secondary coil, wherein the SCC comprises a first capacitor connected in parallel with two electrically controllable switches in series;
a semi-active rectifier (SAR) that connects to output of the SCC for rectifying the output of the SCC, wherein the SAR comprises a bridge circuit that includes two electrically controllable switches;
a plurality of sensors for measuring charging voltage and charging current;
a controller for calculating a conduction angle of the SAR and a control angle of the SCC according to the sensor's measurement and a pre-determined power value; and
at least one signal generator for generating control signals according to the conduction angle and the control angle and providing the control signals to the switches in the SCC and the SAR,
wherein both switches in the SCC are turned on for half a cycle and complement to each other and are turned off with a time delay relative to the zero cross points of the current waveform of the AC power source; that time delay being the control angle of the SCC;
wherein both switches in the SAR are turned on for half a cycle and complement to each other and are turned off with a time delay relative to the zero cross points of the current waveform of the AC power source; that time delay being the conduction angle of the SAR;
wherein the control angle of the SCC and the conduction angle of the SAR are regulated by the control signals to provide a load impedance that matches the impedance of the coils, so that the battery is charged with constant power and the charging efficiency is enhanced.

10. The wireless charging system of claim 9, wherein the bridge circuit in the SAR has two upper legs and two lower legs, each lower leg comprising an electrically controllable switch and each upper leg comprising a diode, wherein each electrical controllable switch comprises a transistor that drain of each transistor is connected with one upper leg respectively, and sources of the two transistors are connected with each other.

11. The wireless charging system of claim 9, wherein each electrically controllable switch in the SCC includes a transistor, wherein drains of the two transistors are connected together and sources of the transistors are connected to two terminals of the first capacitor respectively.

12. The wireless charging system of claim 9, further comprising a filter capacitor connected in parallel with the battery when the SCC is connected in series with the secondary coil.

13. The wireless charging system of claim 9, further comprising a filter inductor connected in series with the battery when the SCC is connected in parallel with the secondary coil.

14. The wireless charging system of claim 9, wherein a maximum efficiency of charging is achieved when the conduction angle of the SAR is regulated as $$\theta = 2 \arcsin\left(\sqrt[4]{\frac{R_{eq,opt}}{\frac{8}{\pi^2}R_L}}\right),$$

wherein $R_L$ is resistance of the battery, $R_{eq,opt}$ is calculated as $$R_{eq,opt} = X_M \sqrt{\frac{R_S}{R_P}},$$

$X_M$ being reactance mutual reactance of the coils, $R_S$ being equivalent resistance representing loss of the primary side, and $R_P$ being equivalent resistance representing loss of the secondary side.

15. The wireless charging system of claim 9, further comprising:
a second capacitor that is connected in series with the SCC,
wherein a maximum efficiency of charging is achieved when the control angle of the SCC is regulated as $$\varphi \approx \pi - \frac{\pi}{2}\sqrt{\frac{|X_{C_S,eq,opt}| - |X_{C_1}| - |X_{eq}|}{|X_{C_2}|}},$$

wherein $X_{CS,eq,opt}$ is a constant that $X_{CS,eq,opt} = X_{LS}$, $X_{LS}$ being self reactance of the secondary coil, $X_{C_1}$ being reactance of the second capacitor, $X_{C_2}$ being reactance of the first capacitor, $X_{eq}$ being an equivalent load reactance of the circuit.

16. The wireless charging system of claim 9, wherein the primary coil operates at one or more fixed frequency.

17. A method executed by a wireless charging system that enhance the efficiency of charging a battery with an AC power source induced at a secondary coil by a primary coil, wherein the AC power source connects to a switch-controlled capacitor (SCC) circuit further connecting to a semi-active rectifier (SAR) circuit, the output of the SAR being connected to the battery to be charged, wherein the SCC comprises a first capacitor connected in parallel with two electrically controllable switches in series and the SAR comprises a bridge circuit that comprises two upper legs and two lower legs, each upper leg comprising one diode, each lower leg comprising an electrically controllable switch, the method comprising:
calculating, by a controller, a conduction angle of the SAR to provide a load resistance that matches the impedance of the coils, wherein the conduction angle is the time delay offset relative to the zero crossing points of the current waveform of the AC power source when a controllable switch at the lower leg of the SAR bridge circuit is turned off;
calculating, by the controller, a control angle of the SCC to counterbalance reactance of the load and the secondary coil, wherein the control angle is the time delay offset relative to the zero crossing points of the current waveform of the AC power source when a controllable switch at the SCC is turned off;
regulating, by a first control signal, the switches in the SAR according to the conduction angle, and
regulating, by a second control signal, the switches in the SCC according to the control angle, so that the wireless charging system charges the battery with constant power and enhance the charging efficiency.

18. The method of claim 17, wherein the conduction angle of the SAR is calculated by comparing charging power with a pre-determined reference power $P_{o,constant}$ that is calculated by $$P_{O,constant} = \frac{8}{\pi^2} \frac{V_I^2}{\omega M} \sqrt{\frac{R_S}{R_P}},$$

where $V_I$ is the charging voltage measured by the sensor, $\omega$ is angular frequency of the AC power source, M is the mutual inductance of the coils, $R_S$ being equivalent resistance representing loss of the primary side, and $R_P$ being equivalent resistance representing loss of the secondary side.

19. The method of claim 17, further comprising:
measuring, by a plurality of sensors, charging voltage and charging current for the battery; and
calculating, by the controller, the conduction angle of the SAR based on the charging voltage and charging current.

20. The method of claim 17, further comprising:
generating, by a first signal generator, the first control signal according to the conduction angle of the SAR; and
generating, by a second signal generator, the second control signal according to the control angle of the SCC.

* * * * *